United States Patent [19]

Kinbara

[11] Patent Number: 6,069,335
[45] Date of Patent: May 30, 2000

[54] ELECTRIC DISCHARGE MACHINE

[75] Inventor: Yoshihide Kinbara, Nagoya, Japan

[73] Assignee: Mitsubishiki Denki Kabushiki Kaisha, Tokyo, Japan

[21] Appl. No.: 08/931,748

[22] Filed: Sep. 16, 1997

[30] Foreign Application Priority Data

Mar. 12, 1997 [JP] Japan ................................. 9-057688

[51] Int. Cl.⁷ .................................................. B23H 1/02
[52] U.S. Cl. ........................................................ 219/69.13
[58] Field of Search ............................ 219/69.13, 69.18, 219/69.12

[56] References Cited

U.S. PATENT DOCUMENTS

| 3,390,245 | 6/1968 | Webb ................................ 219/69.13 |
| 3,409,753 | 11/1968 | Inoue ............................... 219/69.13 |
| 4,382,168 | 5/1983 | Inoue . |
| 4,441,005 | 4/1984 | Furukawa . |
| 4,617,443 | 10/1986 | Martin . |
| 4,940,872 | 7/1990 | Futamura ......................... 219/69.13 |
| 5,019,685 | 5/1991 | Nishimura ....................... 219/69.13 |

FOREIGN PATENT DOCUMENTS

| 3326582 | 10/1987 | Germany . |
| 3003339 | 8/1993 | Germany . |
| 3116857 | 9/1993 | Germany . |
| 61-260921 | 11/1986 | Japan . |
| 64-71622 | 3/1989 | Japan . |
| 4-765 | 1/1992 | Japan . |
| 6-31534 | 2/1994 | Japan . |
| 6-226538 | 8/1994 | Japan . |
| 7-68417 | 3/1995 | Japan . |

OTHER PUBLICATIONS

"McGraw–Hill Dictionary of Scientific and Technical Terms", 4$^{th}$ edition, p. 1663, Dec. 1989.

"NC Type of Engraving Electric Discharge Characteristics and Machining Technology", Mitsubishi Denki Technological Report, No. 6, vol. 61, 1987.

Primary Examiner—Geoffrey S. Evans
Attorney, Agent, or Firm—Sughrue, Mion, Zinn, Macpeak & Seas, PLLC

[57] ABSTRACT

An electric discharge machine for generating electric discharge in a space between an electrode and a work to machine the work, in which saturable reactors are inserted into feeder lines each for feeding a machining power from a machining power source to the electrode as well as to the work and each of the saturable reactors is excited by a current reverse to a discharge current.

23 Claims, 35 Drawing Sheets

PRIOR ART

FIG.35 PRIOR ART
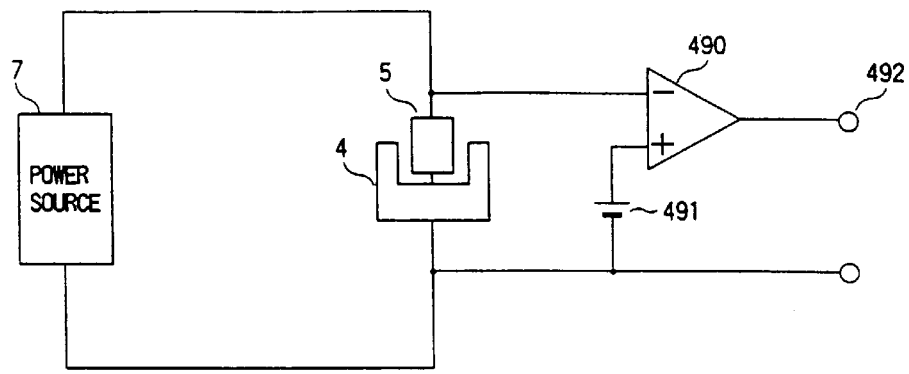
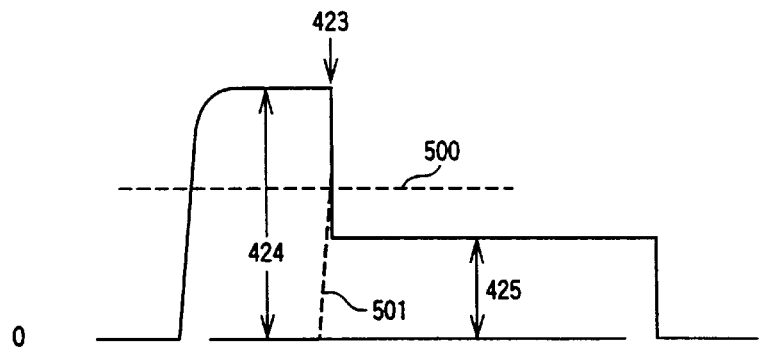
FIG.36A
PRIOR ART
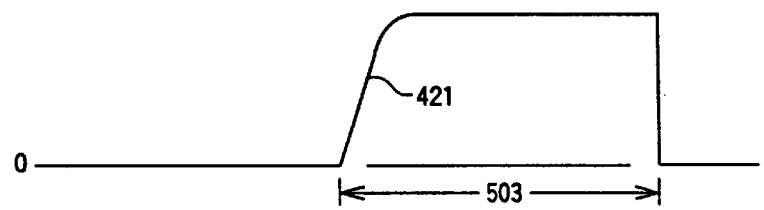
FIG.36B
PRIOR ART
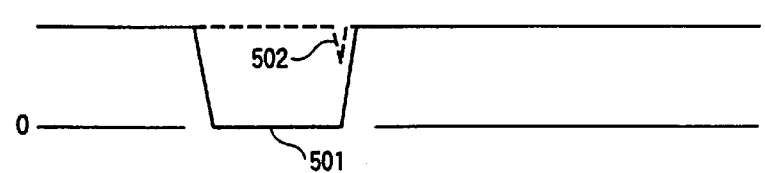
FIG.36C
PRIOR ART

SLOPE-CONTROL WAVEFORM AND
CHARACTERISTICS THEREOF TO A RISING TIME

6,069,335

ELECTRIC DISCHARGE MACHINE

FIELD OF THE INVENTION

The present invention relates to control of a machining current as well as to detection of generation of electric discharge or stop thereof when electric discharge is generated in a power supply unit for an electric discharge machine.

BACKGROUND OF THE INVENTION

As the conventional technology, FIG. 26 shows the "Power supply unit for an electric discharge machine" disclosed in Japanese Patent Laid-Open Publication No. HEI 6-31534. In the figure, provided inside a machining liquid 2 filled in a machining liquid vessel 1 are a work 4 placed on a machining table 3 controlled by a numerical control apparatus or the like and an electrode 5 with the position thereof controlled by an electrode feeding means 6 for machining the work to a desired form, and a machining power is supplied from a power source 7 to a section between the electrode 5 and the work 4 through feeder lines 8A and 8B. Since the power source 7 is generally provided away from the electrode 5 as well a from the work 4, a length of each of the feeder lines 8A and 8B is in a range from 2 to 5 m. For this reason, these feeder lines 8A and 8B are wired close to each other or twisted for wiring to reduce inductance in the wiring. Accordingly, there is sometimes a case where capacitance between the feeder lines 8A and 8B increases.

FIG. 27 is a view showing the "Waveform control apparatus for an electric discharge machine" disclosed in Japanese Patent Laid-Open Publication No. HEI 7-68417. This unit is one example of the power source 7 for feeding a machining power to the electrode 5 and the work 4. The operations of the unit are disclosed in detail in the Invention described above, so that description thereof is omitted herein. When a switching element $TR_2$ is turned ON, a machining power is supplied thereto, and when it is turned OFF, the power thereto is cut off. Although a diode 22 is not described in the Invention, there are many cases where the diode $D_{22}$ is used because another power source is connected to the electrode 5 and the work 4. There are inductances 100, 101 of wiring in the feeder lines 8A, 8B respectively, and there is sometimes a case where the inductances 100, 101 of the wiring resonates to the static capacitance between the feeder lines 8A, 8B because of fluctuation of a voltage at the instant when electric discharge is generated between the electrode 5 and the work 4. FIG. 28 shows actual waveforms of a voltage 420 and a current 421 at the instant when electric discharge is generated therebetween. The voltage is a no-load voltage indicated at the reference numeral 424 and is around 87 V and a discharge current 421 is zero immediately before electric discharge is generated. When electric discharge is generated at the timing 423, the voltage abruptly drops to a discharge voltage indicated at 425 to be about 25 V. The discharge current 421 starts to flow and increase at the instant and on, and the current becomes constant at 30 A in this example. The above description indicates a phenomenon that inductance of the feeder line and the static capacitance resonate when the capacitance between the feeder lines is large, and electric discharge disappears when a current is negative or zero as a portion indicated by 426 in the figure. This phenomenon is called as split pulse, namely electric discharge is not appropriately generated, so that a machining speed may decrease or depletion of the electrode may increase.

In FIG. 27, when the switching element $TR_2$ is turned OFF, a machining current becomes zero, and the diode $D_{22}$ is tuned OFF, a junction capacitance of the diode $D_{22}$ and the inductances 100, 101 of the wiring resonate to each other. FIG. 29 shows actual waveforms of an output voltage 430 and a current 421 from the power source 7 before and after the instant 433 when the switching element $TR_2$ is turned OFF in a state in which electric discharge is being generated between the electrode 5 and the work 4. The voltage is a discharge voltage indicated by 425 and is about 25 V immediately before the switching element is turned OFF, and the discharge current 421 is 20 A in this example. When the switching element $TR_2$ shown in FIG. 27 is turned OFF at the time indicated at 433, the voltage steeply drops to a voltage of around −60 V in a constant voltage body $B_{20}$ indicated at 435. At this instant and on, the discharge current 421 is decreasing and becomes zero at the timing shown at 431. The diode $D_{22}$ is turned OFF right after the current is zero, but a quite high-frequency voltage is generated as indicated at 432 because the junction capacitance and the inductances 100, 101 of the wiring resonate to each other. As for the discharge current, a resonance current flows between the electrode 5 and the work 4 as indicated at 434. This high-frequency voltage 432 gives bad influences over a control circuit as a noise, and the resonance current 434 in the discharge current causes increase of depletion of an electrode because the reverse current flows therein.

FIG. 30 shows a state of machining by the electric discharge machine equivalent to that shown in FIG. 26. The power source 7 and electrode 5, and the source 7 and the work 4 are connected to each other with the feeder lines 8A and 8B respectively. There is static capacitance between the lines because the feeder lines 8A, 8B are wired close to each other. If each of the lines has a length of several meters, the capacitance will be utmost several nanofarads. Also, static capacitance such as a junction capacitance in the switching element and that in the diode or the like exists in output from the power source because the power source is a semiconductor circuit. The capacitance therein is indicated by static capacitance C1. FIG. 31 shows a voltage and a current between the electrode 5 and the work 4 in the electric discharge machine shown in FIG. 30. The voltage 420 rises, and before electric discharge is generated, the static capacitance C1 is charged to no-load voltage at 424. Then, when electric discharge is generated at the timing indicated at 423, the voltage between the electrode 5 and work 4 becomes a discharge voltage 425. Accordingly, electric charge accumulated in the capacitance C1 flows as a large current to an electric discharge generating point A through the feeder lines 8A, 8B. This phenomenon is shown at the reference numeral 450 in FIG. 31, and if the inductance of the feeder lines is low, a pulse current 450 having the sharp leading edge as well as the peak at a high level flows for a short period of time. This pulse current 450 flows regardless of an amplitude of the discharge current 421. Accordingly, when the discharge current 421 has a small amplitude, namely when the discharge current is used for finishing electric discharge machining, the electrode 5 has, in many cases, a small size, which causes the electrode 5 to be substantially depleted due to this pulse current 450. If the feeder lines 8A, 8B are wired close to each other by twisting them or the like so that the inductance of the feeder lines will be as small as possible to enhance the performance of electric discharge machining, the static capacitance C1 increases and a peak value of the pulse current 450 becomes high, which causes depletion of the electrode to inconveniently increase, which is disadvantageous.

FIG. 32 is a view showing the "Power supply unit for an electric discharge machine" disclosed in Japanese Patent Laid-Open Publication No. HEI 6-31534. The power source 7, electrode 5 and work 4 are connected to each other with a coaxial cable 36. In a case where the wiring therebetween is executed through a coaxial cable as described above, inductance in the wiring is reduced with a high-speed response to a machining current improved, so that the performance of the electric discharge machine is improved. However, the capacitance 37 is large due to the characteristic of the coaxial cable and the inductance in the wiring is small, so that the surge current 450 shown in FIG. 31B becomes so high and the electrode is largely depleted, which causes the wiring through a coaxial cable to be infeasible.

FIG. 33 is a view showing an "Electric discharge machine for partial machining" disclosed in Japanese Patent Laid-Open Publication No. HEI 6-226538. A plurality of electrodes 5a, 5b, 5c and a work 4 are connected to the common power source 7. In a case where the connection therebetween is executed as described above, if electric discharge is generated in the electrode 5b, electrical charge accumulated in the static capacitance between the electrode 5a and the work 4 as well as in the static capacitance between the electrode 5c and the work 4 is flown into the electric discharge generating point A as indicated at 470. This current becomes larger as the number of electrodes provided therein increases. As described above, when electric discharge machining is executed by connecting the plurality of electrodes to the power supply unit, the surge current 450 shown in FIG. 31 becomes large, which causes the electrodes to be great depleted. As shown in FIG. 34, a plurality of power sources 7a, 7b, 7c may be connected to a plurality of electrodes 5a, 5b, 5c respectively, however, the method causes the cost to increase as well as the way of control to become complicated, so that it is found not to be practical.

FIG. 35 shows one example of an electric discharge detector for the electric discharge machine. In this detector, a voltage between an electrode 5 and a work 4 and a reference voltage 491 are inputted into a comparator 490, and an output 492 from this comparator 490 is outputted as a signal indicating detection of electric discharge.

FIGS. 36A to 36C show operations of this circuit. In FIG. 36A, when a machining voltage is applied thereto from the power source 7, the voltage between the electrode 5 and the work 4 is a no-load voltage 424. Then, when electric discharge is generated at the timing indicated at 423, the voltage becomes a discharge voltage 425 and a discharge current 421 flows therein as shown in FIG. 36B. If the reference voltage 491 is preset at the level indicated at 500, the signal 492 indicating detection of electric discharge is outputted as indicated at 501 when the voltage between the electrode 5 and the work 4 exceeds the reference voltage 500 as shown in FIG. 36C. However, there may frequently occur a phenomenon called immediate electric discharge that electric discharge is immediately generated before the voltage does not reach a no-load voltage to be a discharge voltage 425 as shown indicated by a dotted line at 501 in FIG. 36A. Accordingly, in the case as described above, the signal indicating detection of electric discharge is sometimes not outputted as shown at 502 in FIG. 36C. In this case, generation of electric discharge can not be detected, so that a period of time 503 while a discharge current 421 is flowing can not correctly be detected, which is disadvantageous.

FIG. 37 shows actual waveforms of the voltage 420 and the current 421 at the instant when electric discharge is generated between the electrode 5 and the work 4, which is the same as the case shown in FIG. 28. The voltage is a no-load voltage indicated at 424, around 87 V and a discharge current 421 is zero immediately before electric discharge is generated. When electric discharge is generated at the time indicated at 423, the voltage abruptly drops to a discharge voltage indicated at 425 to become around about 25 V. The discharge current 421 starts to flow at this instant and on, then increases, and the current becomes constant at 30 A in this example. This discharge current 421 very quickly increases, so that the current becomes around 13 A at the time indicated at 511 in 0.5 $\mu$sec from generation of electric discharge and reaches around 27 A at the timing indicated at 512 in 1 $\mu$sec therefrom. For this reason, even if a comparator with a high-speed response is used for the comparator 490 shown in FIG. 35 to obtain a signal 492 indicating detection of electric discharge according to the generation of electric discharge 423, the discharge current 421 has already risen, so that the timing 513 close to the rising edge of the discharging current 421 can not be controlled. Accordingly, there has not been such an electric discharge machine in which a discharge current can be controlled to arbitrary waveforms at the instant and on when electric discharge is started. For this reason, there has not been proposed any result of research on optimal waveforms with which depletion of an electrode is suppressed to a low level at the time of rising of a discharge current which causes most serious depletion of the electrode. It should be noted that a method called as a slope controlling, in which a discharge current is increased in a linear slope at the time when electric discharge is started and on, is used for products and it is understood from the method that the less the slope is inclined the less the electrode is depleted. However, if the slope has too small an inclination, a rising speed of a current is also slow after a point of time close to the starting time of the discharge current, so that an average value of a machining current drops, which causes a machining speed to become low.

FIG. 38 shows a view in which an X-axis in the "Slope-control waveform and characteristics thereof to a rising time" disclosed in Mitsubishi Denki Technological Report No. 6 Vol. 61 in 1987 is replaced with a changing rate of a current. This machining is executed under such conditions that an electrode is copper, a work is iron (SK3), a peak current is 11A, and a pulse width is 250 $\mu$sec, and measurement is executed by changing a rising speed of a discharge current. It is understood from this figure that the electrode is less depleted when a changing rate (a rate of increase) of a current is lower. Also, the machining speed significantly drops at a lower portion of the changing rate of the current.

Also section of 2.1.2 "Machining with extremely low depletion in the cited reference includes the description" that "an entire current density is kept at a low level in accordance with expansion of an arc column, and as a result, the electronic current density is kept at a low level as described in the previous section so that depletion of the positive electrode can be reduced. If a slope controller is used, an electrode depletion rate of 0.1 to 0.01% can be obtained". However, in the slope controlling in which a discharge current is raised in a linear slope at the starting of the electric discharge and on, a current is increased at a constant speed from the low current up to the peak current, and such effects that the entire current density is kept at a constant level in accordance with expansion of the arc column (electric-discharge column) are effective up to the point of time immediately after start of the electric discharge, so that it is conceivable that increase of a current due to the slope may be slower as compared to increase of a cross-sectional area of the electric-discharge column after the current increases to a certain level, which is equivalent to a case where an average value of the current drops, and it is conceivable that the phenomenon causes a machining speed to significantly drop when the changing rate of the current is low.

A machining current in the conventional type of electric discharge machine is controlled as described above, so that there have been several problems such as that sometimes an electrode becomes very depleted as described above, that a machining speed is reduced, that electric discharge can not be detected in the instant of electric discharge, or that generation of electric discharge can not be detected before the discharge current begins.

It is an object of the present invention to obtain an electric discharge machine in which generation of electric discharge can be detected even in a state of the instant of electric discharge, generation of electric discharge can be detected before the discharge current starts up, depletion of an electrode can be reduced, and a machining speed does not drop.

SUMMARY

In an electric discharge machine according to the present invention for generating electric discharge in a space between an electrode and a work to machine the work, a saturable reactor is inserted into a feeder line for feeding a machining power from a machining power source to the electrode as well as to the work and the saturable reactor is excited by a current that is opposite to a discharge current.

The electric discharge machine detects a voltage generated in an electric wire penetrating or wound around the saturable reactor to excite it and outputs the detected voltage as a signal indicating generation of electric discharge between an electrode and a work.

The electric discharge machine detects a voltage generated in an electric wire penetrating or wound around the saturable reactor to excite it and outputs the detected voltage as a signal indicating stop of electric discharge between an electrode and a work.

The saturable reactor comprises a plurality of saturable reactors each having a different magnetic path length.

The saturable reactor provided to obtain a signal indicating generation of electric discharge between an electrode and a work is, of a plurality of saturable reactors each having a different magnetic path length, one having the shortest magnetic path length.

Further the saturable reactor has a form having a large diameter in the central section in the axial direction and also having a smaller diameter at position closer to either one of the two edges.

Also the saturable reactor comprises a plurality of saturable reactors each having the different number of turns of a feeder line therearound.

The saturable reactor provided to obtain a signal indicating generation of electric discharge between an electrode and a work is, of the plurality of saturable reactors each having the different number of turns of feeder line therearound, one having the largest number of turns of feeder line.

The saturable reactor provided to obtain a signal indicating generation of electric discharge between an electrode and a work is located at a position closer to the electrode or the work, and another saturable reactor is located at a position closer to an output side of a machining power source.

In the electric discharge machine for generating electric discharge between a plurality of electrodes and a plurality of works to machine the plurality of works, a saturable reactor is inserted into each of feeder lines supplying a machining power from the machining power source to the electrode as well as to the work and the saturable reactor is excited by a current reverse to a discharge current.

The saturable reactor provided to obtain a signal indicating generation of electric discharge between a plurality of electrodes and a plurality of works is inserted into each of the feeder lines supplying a machining power from a machining power source to the electrode as well as to the work, the saturable reactor is excited by a current reverse to a discharge current, detects a voltage generated in an electric wire penetrating or wound around the saturable reactor to excite it, and outputs the detected voltage as a signal indicating generation of electric discharge between each of said electrodes and said works respectively.

Further a means for exciting the saturable reactor is a serial array comprising a resistor and a DC power source.

The saturable reactor having a small inner diameter is provided in a slender portion of a tool for attaching an is electrode to an electrode feeding means and is supported by an insulating support.

In a saturable reactor with a feeder line for supplying a machining power from the machining power source to an electrode and to a work penetrating therethrough or wound therearound, an electric wire provided separately from the feeder line described above and penetrating or wound around the saturable reactor is connected to a core line of a coaxial cable as well as to shield thereof, a serial array of a resistor and a DC power source is connected to the other edge of the coaxial cable so that the saturable reactor is excited by a current reverse to a discharge current, and a signal indicating generation of electric discharge between the electrode and the work is obtained by comparing a voltage between a core line at the other edge of the coaxial cable and the shield to a preset value.

In a saturable reactor with a feeder line for supplying a machining power from a machining power source to an electrode and to a work penetrating therethrough or wound therearound, an electric wire provided separately from the feeder line and penetrating or wound around the saturable reactor is connected to a core line of a coaxial cable and shield thereof, a serial array of a resistor and a DC power source is connected to the other edge of the coaxial cable so that the saturable reactor is excited by a current reverse to a discharge current, and a signal indicating stop of electric discharge between the electrode and the work is obtained by comparing a voltage between a core line at the other edge of the coaxial cable and the shield to a preset value.

A resistance value of a resistor in a serial array of a resistor and a DC power source is set to the same value as a characteristic impedance of the coaxial cable.

A serial array of a resistor and a DC power source is connected to each of electric wires provided separately from feeder lines each penetrating or wound around each of a plurality of saturable reactors each having a different magnetic path length or a different number of turns of a feeder line for supplying a machining power from a machining power source to the electrode and to the work so that each of the plurality of saturable reactors is excited by a current reverse to a discharge current and an increase curve of the discharge current is matched to a curve suited to electric discharge machining.

An increase curve of the discharge current is matched to a curve suited to electric discharge machining by changing a resistance value of the resistor or a voltage of the DC power source.

Further, switches are provided in parallel to electric wires provided separately from the feeder lines and penetrating or wound around the saturable reactors and an increase curve of a discharge current is matched to a curve suited to electric discharge machining by changing combination of ON and OFF states of the switches.

Also, switches are provided in parallel to feeder lines penetrating or wound around a plurality of saturable reactors and an increase curve of a discharge current is matched to a curve suited to electric discharge machining by changing combination of ON and OFF states of the switches.

Other objects and features of this invention will become understood from the following description with reference to the accompanying drawings.

BRIEF DESCRIPTION OF THE DRAWINGS

FIG. 3 shows in an enlarged form a result of measurement of a current and voltage before and after the point of time 423 when electric discharge is generated shown in FIG. 2;

FIG. 5 shows enlarged waveforms in each section before and after the time 433 when a discharge current is cut off;

FIG. 7 shows enlarged waveforms of a discharge voltage 133 and of the discharge current 421 between the electrode 5 and the work 4 shown in FIG. 6 before and after the instant at which electric discharge is generated thereof;

FIG. 8 is enlarged waveforms showing a discharge voltage 133 and of the discharge current 421 between the electrode 5 and the work 4 shown in FIG. 6 before and after the instant at which electric discharge thereof is cut off;

FIG. 9 shows a state in which electric-discharge generation-detectors each using the saturable reactor shown in FIG. 6 are provided on feeder lines respectively connecting three pieces of electrodes 5A, 5B, 5C and works 4A, 4B, 4C to the same one power source 7;

FIG. 12 is a view showing the simplest configuration for explanation of operations according to the present invention;

FIG. 17 shows a state in which the components according to Embodiment 10 are attached to the electrode feeding means 6;

FIG. 35 is one example of an electric discharge detector for an electric discharge machine for explanation of operations in the power supply unit for the electric discharge machine based on the conventional technology;

FIG. 36 is a waveform view for explanation of operations in the power supply unit for the electric discharge machine based on the conventional technology shown in FIG. 35;

DESCRIPTION OF THE PREFERRED EMBODIMENTS

Figure 1:
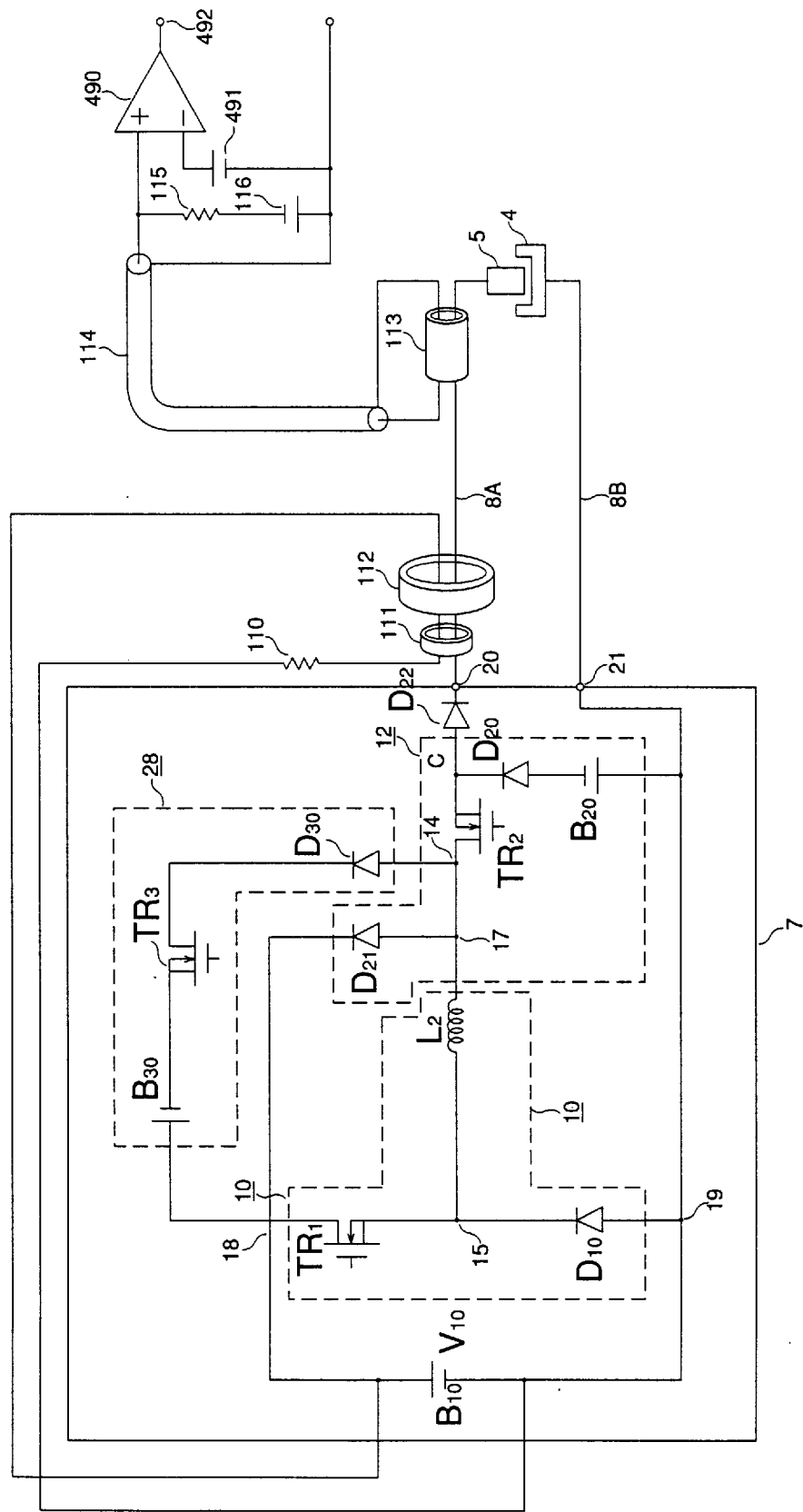
FIG. 1 is a waveform control unit for the electric discharge machine according to Embodiment 1 of the present invention.

Detailed description is made hereinafter for embodiments of the present invention with reference to the attached drawings. It should be noted that, in the embodiments of the present invention, the same reference numerals are assigned to the sections corresponding to those in the example based on the conventional technology, so that description thereof is omitted herein.

A saturable reactor generally indicates a magnetic material saturated even in a magnetic field having comparatively weak strength, of magnetic materials in which a flux density does not increase, namely is saturated when strength of the magnetic field is strengthened by adding a magnetic field to the magnetic material, formed to a doughnut-shape or a cylindrical shape with an electric wire penetrating through or wound around the magnetic material. In the present invention, in addition to the saturable reactor, any magnetic material can be used as a saturable reactor if it has the characteristics of being saturated.

Accordingly, as the magnetic material for a purpose of the present invention, various types of magnetic materials each with the saturable characteristics such as amorphous, permalloy, or a silicon steel plate or the like are available.

FIG. 1 shows a waveform control unit for an electric discharge machine according to Embodiment 1 of the present invention.

Figure 27:
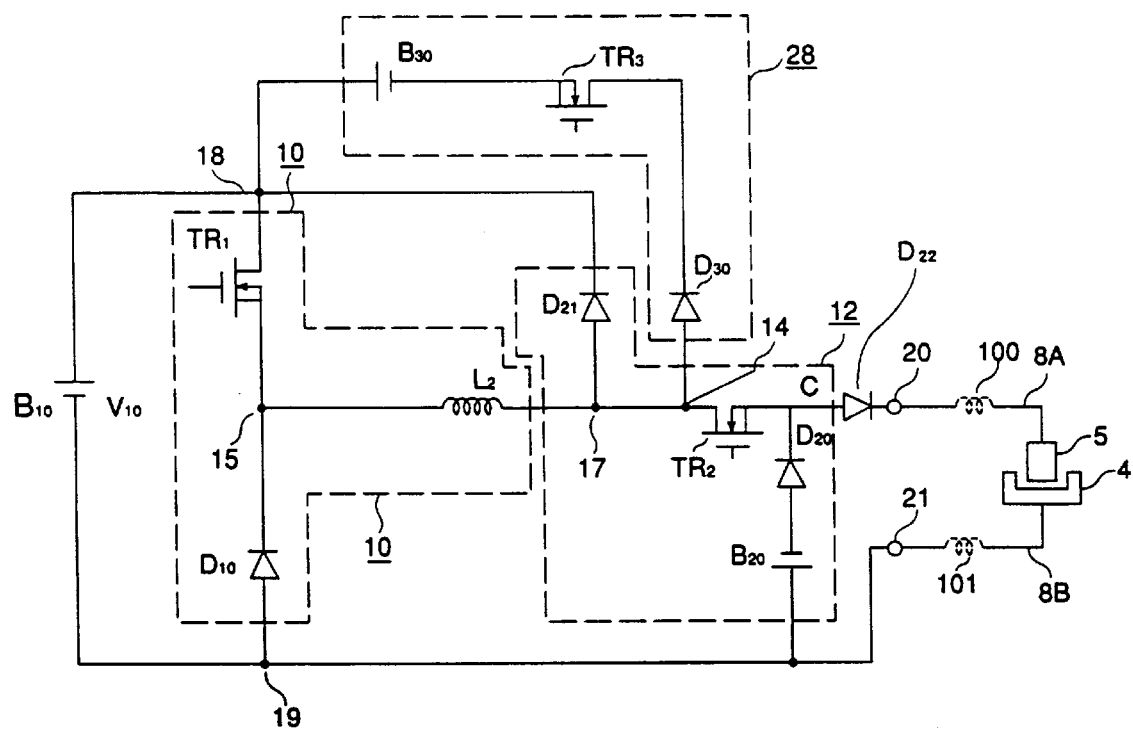
FIG. 27 is a circuit diagram for explanation of operations in the power supply unit for the electric discharge machine based on the conventional technology.

In the figure, a power source 7 is the "Waveform control apparatus for the electric discharge machine" shown in FIG. 27 which is an example based on the conventional type of technology. Saturable reactors 111, 112 are provided at positions closer to the power source 7 on feeder lines 8A, 8B connecting the power source 7 to an electrode 5 as well as to a work 4, while a saturable reactor 113 is provided at a position closer to the electrode 5 thereon, and the saturable reactors 111, 112 are connected so that a current flowing through a resistor 110 connected to a DC power source $B_{10}$ in the power source 7 causes excitation in the direction reverse to the direction in which the saturable reactors 111, 112 are excited by a discharge current. The saturable reactor 113 is connected to a coaxial cable 114 having an arbitrary length by penetrating or winding a core line and shield in the side of the saturable reactor 113 through or around the saturable reactor 113. A serial array of a resistor 115 and a DC power source 116 is connected to the other edge of the coaxial cable 114 so that a current flowing in the line of the coaxial cable 114 penetrating or wound around the saturable reactor 113 causes excitation in the direction reverse to the direction in which the saturable reactor 113 is excited by a discharge current, and the core line of the coaxial cable is connected to a positive input terminal of a comparator 490, while a reference voltage 491 is connected to a negative input terminal thereof, and a signal 492 indicating generation of electric discharge is outputted when a voltage between the core line of the coaxial cable and the shield exceeds the reference voltage 491. With this configuration, the coaxial cable is wired so that a voltage generated in the saturable reactor 113 provided at a position close to the electrode will be spaced by an arbitrary distance, and with this feature the comparator 490 can be provided at the position of the control circuit. The resistor 115 may have the same resistance value as that of a characteristic impedance of the coaxial cable 114. If a coaxial cable has a characteristic impedance of 50 Ω, the resistance value may be set to 50 Ω.

Figure 2:
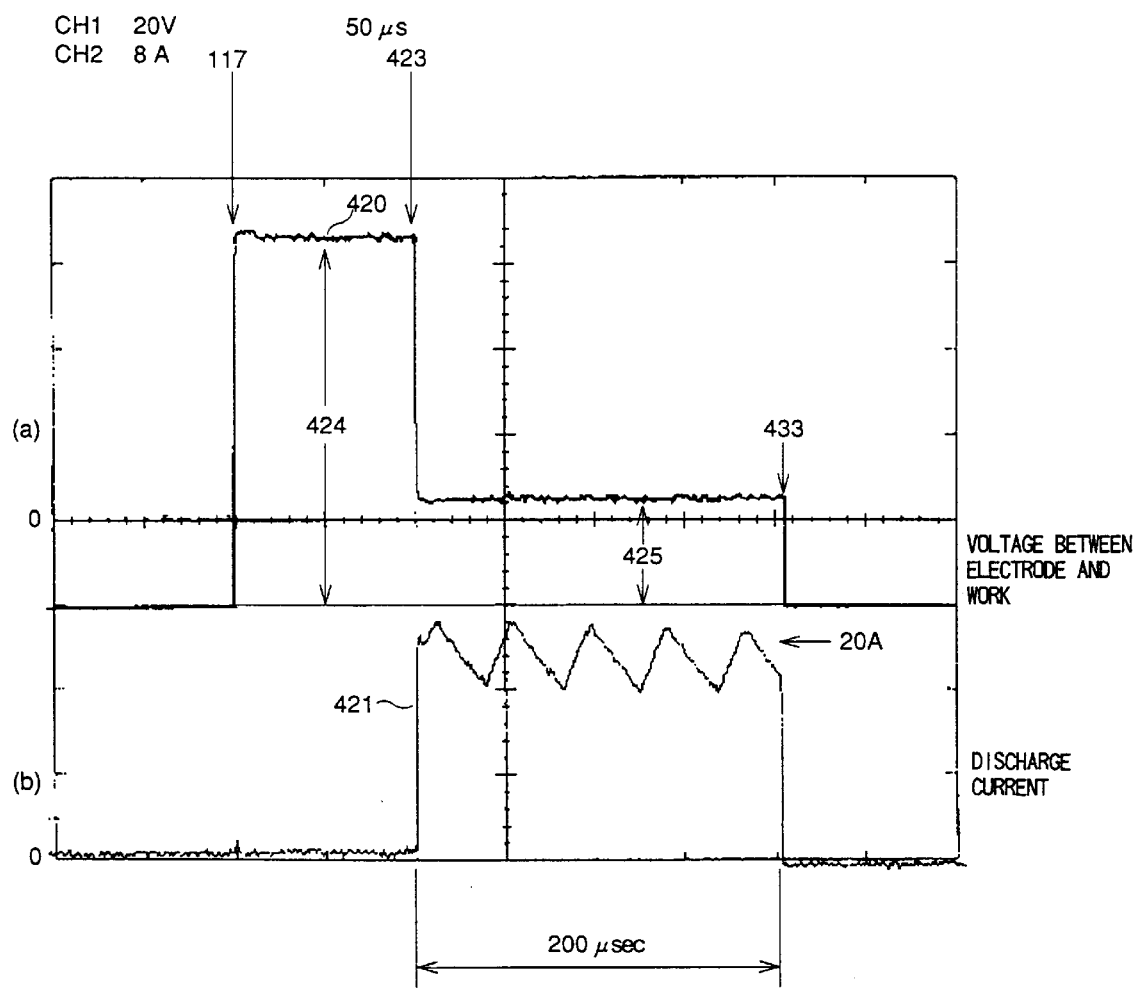
FIG. 2 is a view for explanation of operations in the waveform control unit for the electric discharge machine according to Embodiment 1 of the present invention.

Next description is made for operations of the waveform control unit for the electric discharge machine according to Embodiment 1. (a) in FIG. 2 shows a voltage 420 between the electrode 5 and work 4, and (b) in FIG. 2 shows a current 421. When the switching element $TR_2$ shown in FIG. 1 is turned ON at the timing indicated at 117, a voltage $V_{10}$ of the DC power source $B_{10}$ is applied to the electrode 5 as well as to the work 4. This voltage is no-load voltage 424 before electric discharge is generated and around 87 V is applied thereto. When electric discharge is generated at the timing indicated at 423, the voltage 420 steeply drops to a discharge voltage 425 to be around 25 V. A discharge current 421 abruptly rises to a current value such as to 20 A previously flowing in a reactor $L_2$. Then an average value of the current is controlled to 20 A as a preset value by turning ON and OFF the switching element $TR_2$. This value is a peak current, and a discharge current with a pulse width of around 200 μsec is flowing therein. When the switching element $TR_2$ is turned OFF at the preset time 433, the discharge current 421 is instantly cut off to be zero and electric discharge between the electrode 5 and the work 4 is extinguished.

Figure 3:
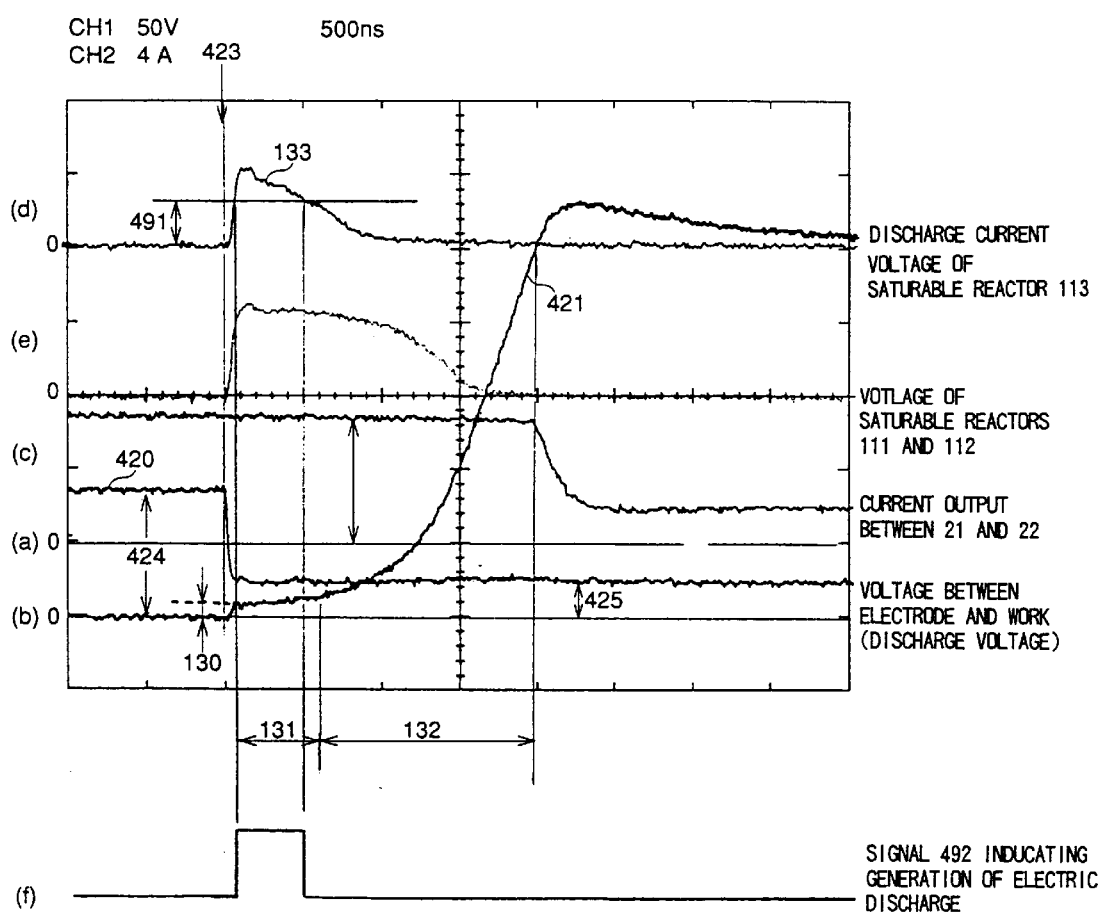
FIG. 3 is a waveform view for explanation of operations in the waveform control unit for the electric discharge machine according to Embodiment 1 of the present invention; and also

FIG. 3 is a view showing in an enlarged form a result of measurement before and after the point of time 423 when electric discharge is generated in FIG. 2. (a) in FIG. 3 shows a voltage 420 between the electrode 5 and the work 4 which instantly drops to the discharge voltage 425. (b) in FIG. 3 shows a discharge current 421, which is about to flow when electric discharge is generated, but it is restricted by the impedance of the saturable reactors 111, 112, 113 and is kept for a specified period of time as a saturation current 130. Assuming that this saturation current 130 is set to is, 1s, 1s expressed by the following equation.

$$1s = Hs \cdot L/N (A) \qquad <500>$$

Hs: a magnetic force required for a saturation flux density Bs (AT/m)

L: an average magnetic path length of cores in saturable reactors

N: the number of turns around a core

As shown by Equation 500, the saturation current 130 is smaller when the average magnetic path length L of the cores in the saturable reactors is shorter and the number of turns N around the core is larger among the saturable reactors 111, 112, 113, so that the saturable reactor 113 provided to obtain a signal indicating generation of electric discharge between the electrode 5 and the work 4 shown in FIG. 1 is, of the plurality of saturable reactors each having a different magnetic length, one having the smallest saturation current 130, or is, of the plurality of saturable reactors each having the different number of turns around a core, one having the largest number of turns around a core, whereby a voltage 133 shown in (d) in FIG. 3 is generated at the both edges of the saturable reactor 113 earliest as compared to those in the other saturable reactors 111, 112. This voltage outputs a signal 492 indicating generation of electric discharge shown in (f) in FIG. 3 by comparing it to the reference voltage 491 inputted to the comparator 490 through the coaxial cable 114. If the resistor 115 has the same resistance value as that of a characteristic impedance of the coaxial cable 114 at that time, reflection is not generated and noise in the waveform is reduced, so that a correct signal 492 indicating generation of electric discharge can be outputted. As for the DC current power source 116 shown in FIG. 1, a comparatively low voltage may be sufficient because a current by which saturation in the saturable reactor 113 is reset after a discharge current is zero may flow therein. The saturable reactor is sufficiently operated by a current of around 5 to 15 V, so that a power source of the comparator 490 can be used, and for this reason a low-cost electric discharge machine can be realized.

Also, a core line and shield in the saturable reactor 113 side of the coaxial cable 114 are short-circuited in a DC current, so that a voltage inputted to the positive input terminal of the comparator 490 is zero at the steady state and a voltage 133 is outputted for a specified period of time only immediately after the electric discharge is started. Also the saturable reactor 113 is saturated, and a voltage is not outputted, so that noise or the like due to electric discharge machining is not outputted, and detection with high precision can be achieved.

In the saturable reactor 111, the number of turns N around a core is smaller than that in the saturable reactor 113 or an average magnetic path length L thereof is longer than that of the saturable reactor 113, and in the saturable reactor 112 the number of turns N around a core is further smaller than that in the saturable reactor 111 or an average magnetic path length L thereof is further longer than that of the saturable reactor 111. With this feature, the discharge current 421 can be increased exponentially as indicated by the increase curve of the discharge current 421 shown in FIG. 3 as shown in the period of time 132 by adjusting the discharge current by cables each having a different core diameter or the number of pieces of core and the number of turns of a core. If this current increase curve is adjusted so that the current increases in accordance with expansion of an electric-discharge column, the current density of the electric-discharge column can be kept at a constant level and a discharge current does not abruptly increase when the cross-sectional area of the electric-discharge column is small, so that depletion of an electrode can be reduced. If a diameter of the electric-discharge column linearly increases, an area of the electric-discharge column goes up with the square of the diameter thereof, so that increase of the discharge current 421 can be realized by adjusting the core so that it increases in a curve of the second order.

A saturation time Ts in each of the periods of time 131 and 132 in each of the saturable reactors 111, 112, 113 can be expressed by the following equation.

$$Ts = N \cdot S \cdot Bs / E (\mu sec) \qquad <501>$$

Figure 4:
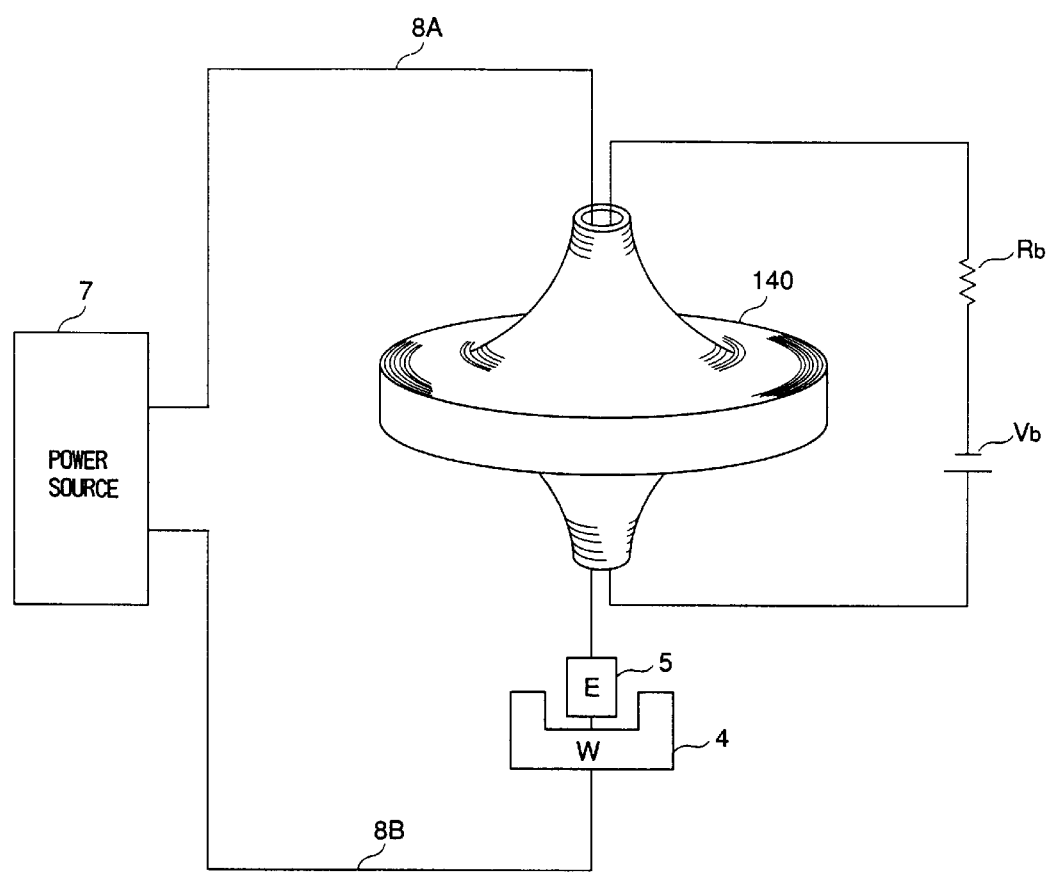
FIG. 4 is a view showing a form of the saturable reactor according to Embodiment 1 of the present invention.

N: the number of turns of a core
S: a cross-sectional area of a core
Bs: change of an entire flux
E: voltage The saturation time Ts becomes longer when the number of turns N of a core and the cross-sectional area S of the core are larger. The number of turns N around a core is decided by setting the saturation current is shown by Equation <500>, so that the saturation time Ts is set according to the cross-sectional area S of the core. Namely, to make a saturation time Ts longer, a large type of core with a large cross-sectional area S thereof is used. Also, to match an increase curve of the discharge current 421 to a target curve, there are such methods as those in which various types of saturable reactors having a difference saturation current 1s and a different saturation time Ts respectively are combined, in which the number of turns N around a core in each of the saturable reactors is adjusted, and in which the saturable reactor 140 with a form having a large diameter in the central section in the axial direction and also having a smaller diameter at position closer to either one of the two edges as shown in FIG. 4 is inserted into either the feeder line 8A or 8B and a bias DC power source Vb for flowing an excited current reverse to a discharge current with a resistor Rb serially connected thereto is connected to the saturable reactor 140 or the like, and the same effect can be achieved in each of the methods as described above.

When the saturation time Ts has passed, the saturable reactor is magnetically saturated, so that the impedance thereof becomes close to zero, the discharge current reaches the peak current, and then the discharge current becomes zero when electric discharge is cut off, by which a current voltage for electric discharge machining is not affected at all until the saturated state is reset by a reversely excited current. The reactor has the effect as described above, which can not be provided by any reactor not saturated. If an empty core coil or a core with a gap or the like is used, impedance thereof does not become zero but remains, so that a time required for cutting off the current when a discharge current is to be cut off is delayed. Accordingly, use of a saturable reactor which is saturated while a discharge current is flowing therein is different from using just an ordinary reactor, and it has the specific effect as described above.

Figure 28:
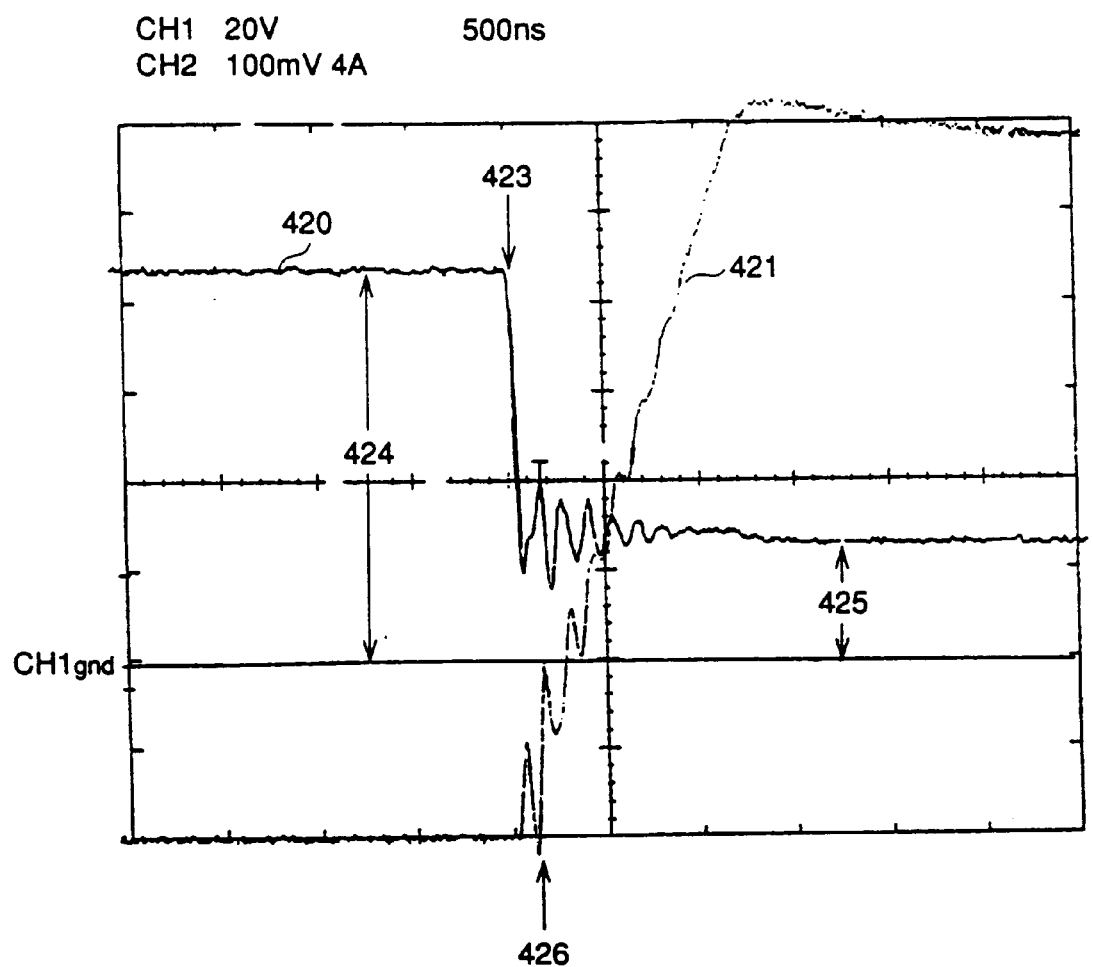
FIG. 28 is a waveform view for explanation of operations in the power supply unit for the electric discharge machine based on the conventional technology.
Figure 29:
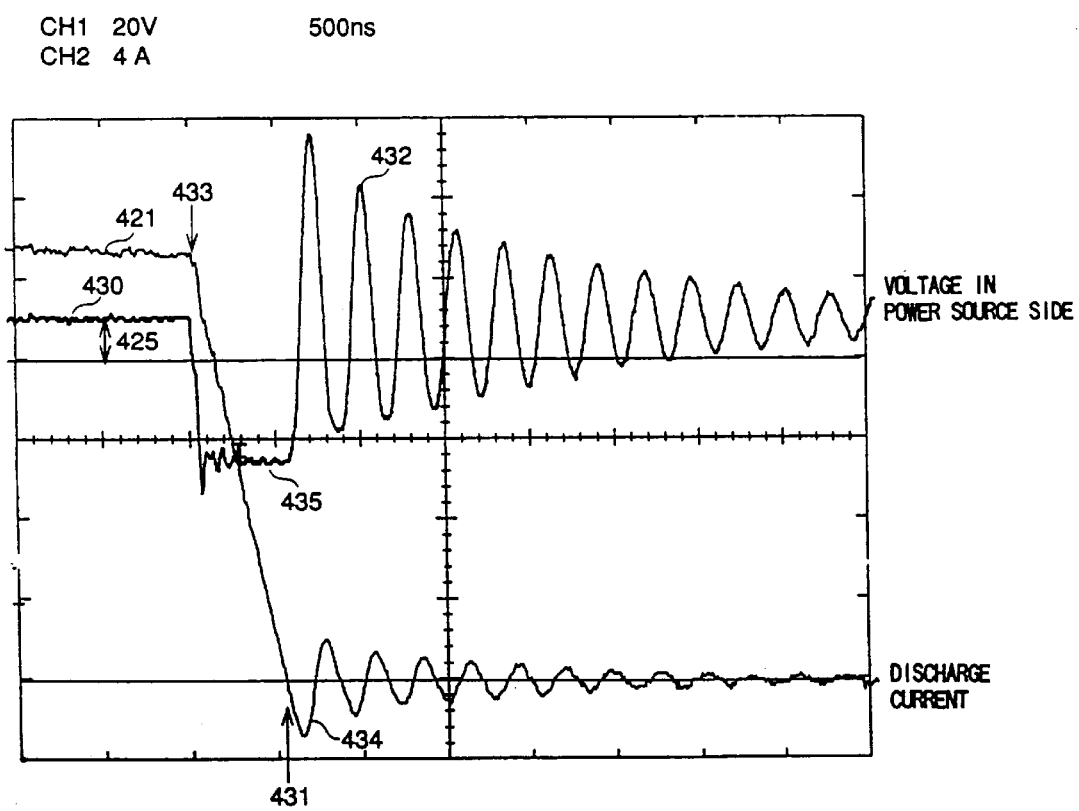
FIG. 29 is a waveform view for explanation of operations in the power supply unit for the electric discharge machine based on the conventional technology.
Figure 30:
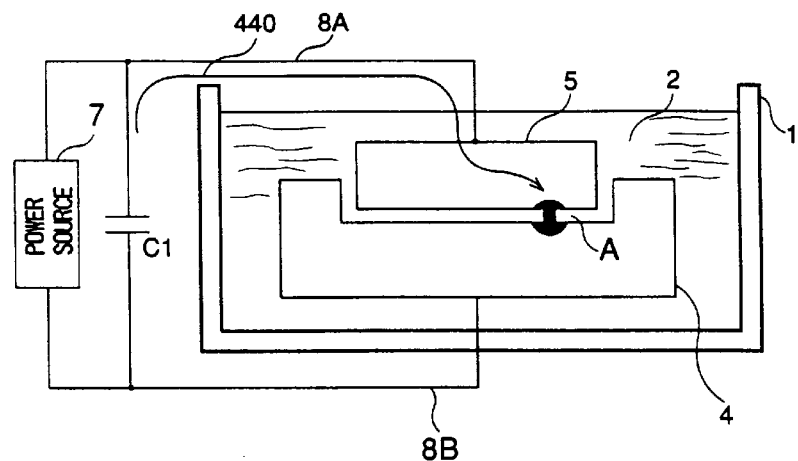
FIG. 30 is a block diagram for explanation of operations in the power supply unit for the electric discharge machine based on the conventional technology.
Figure 31A:
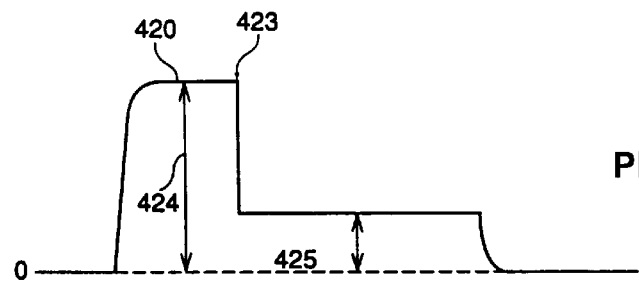
FIG. 31 is a waveform view for explanation of operations in the electric discharge machine shown in FIG. 30.
Figure 31B:
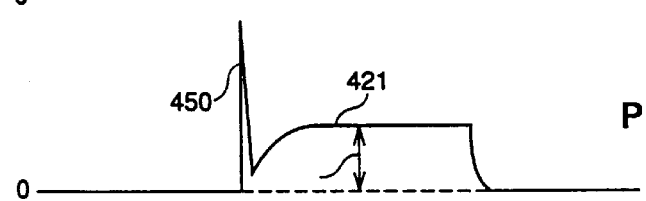

The saturable reactors 111, 112 shown in FIG. 1 are provided in the side closer to the output of the power source 7 and the saturable reactor 113 therein is provided in the side closer to the electrode 5. The saturable reactors 111, 112 provided in the side closer to the output of the power source 7 is effective, as described in the section 2 of Prior Art in FIG. 29, for preventing resonance of a static capacitance in the diodes $D_{22}$ or $D_{20}$ or the like provided at the output of the power source 7 and the inductance of the feeder 8A, 8B. Also, the reactors act for preventing a negative current 434 due to resonance from flowing in the electrode 5 at the instant 431 at which the discharge current shown in FIG. 29 is cut off. While the saturable reactor 113 provided in the side closer to the electrode 5, as described in the section 2 of Prior Art in FIG. 28, can act for preventing pulse splitting in which a current becomes a negative one as indicated by 426 because of resonance of the static capacitance between the feeder lines 8A, 8B to the inductance at the instant 423 when electric discharge is generated. Also, the reactor 113 has a saturation current 130 equal to the discharge current 421, so that it acts for preventing the surge current 450 as shown in FIG. 31B from flowing in the electrode 5 immediately after generation of the electric discharge.

Figure 5:
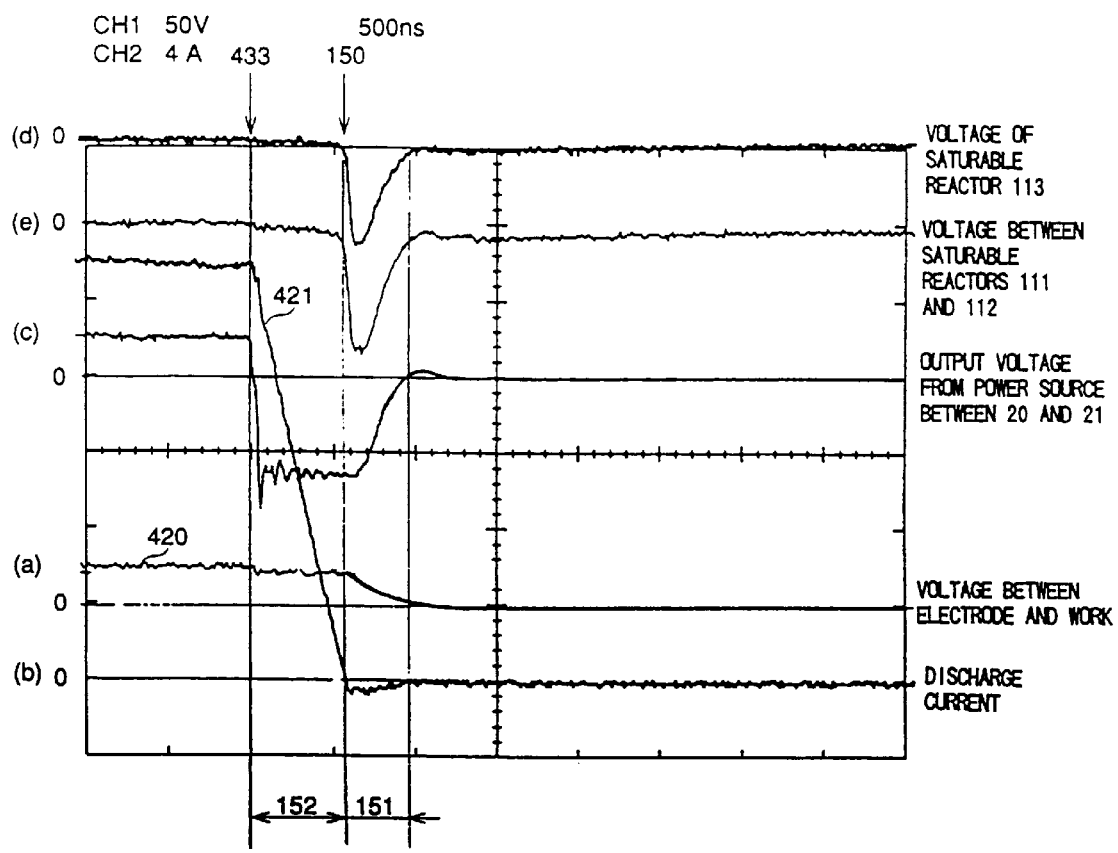
FIG. 5 is a waveform view for explanation of operations in the waveform control unit for the electric discharge machine according to Embodiment 1 of the present invention; and also

FIG. 5 shows enlarged waveforms in each section before and after the timing 433 when a discharge current is cut off as shown in FIG. 2. When the switching element $TR_2$ shown in FIG. 1 is turned OFF, the discharge current 421 shown in (b) decreases in a gradient decided according to each inductance of the feeder lines 8A, 8B as well as to a voltage in the constant-voltage body $B_{20}$, and it becomes zero at the time indicated at 150. At this point of time, as shown by 434 in FIG. 29, the saturable reactors 111, 112, 113 operate so that a reverse current will not flow, otherwise a static capacitance in the diodes $D_{22}$ or $D_{20}$ provided at the output of the power source 7 resonate to the inductance of the feeder lines 8A, 8B and high impedance is generated in saturable reactors 111, 112, and 113. Namely, in the saturable reactors, each voltage in (e), (d) is generated in the period of time indicated at 151, which prevents generation of a reverse current, so that only an extremely slight reverse current can be seen in (b) in the period of time indicated at 151, and the resonance current 434 as shown in FIG. 29 is not generated therein. Accordingly, the period of time 152 required for cutting off a current is almost the same as that in a case where the saturable reactors 111, 112, 113 are not provided, and in addition, depletion of an electrode due to a reverse current can be reduced, the resonant voltage 432 shown in FIG. 29 does not occur, which suppresses generation of noises, and any malfunction due to noise given to other controllers can also be reduced, which are a portion of the advantages provided by the saturated reactor according to this embodiment of the present invention.

Figure 6:
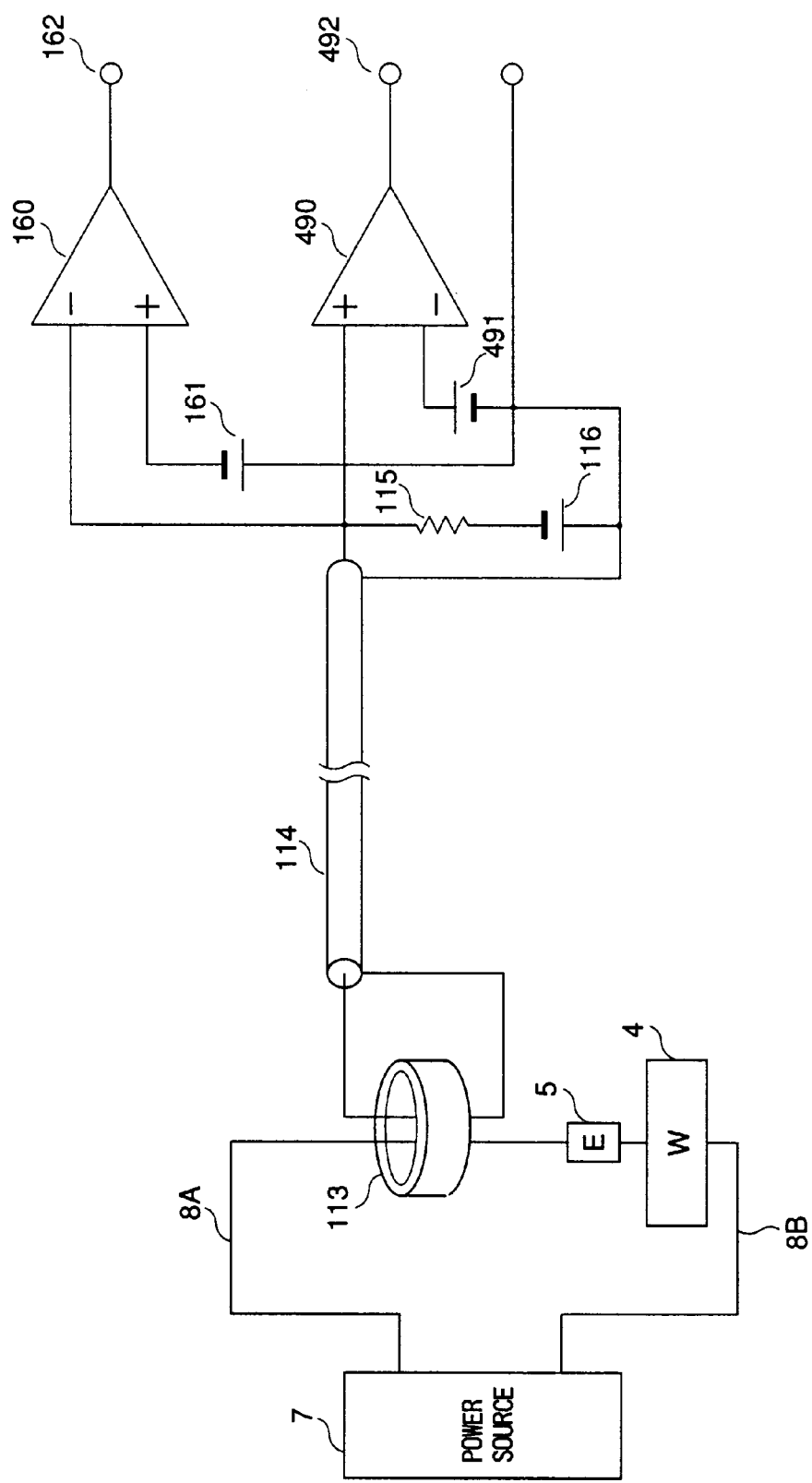
FIG. 6 is a waveform control unit for the electric discharge machine according to Embodiment 2 of the present invention.

FIG. 6 shows a waveform control unit for an electric discharge machine according to Embodiment 2 of the present invention.

In this embodiment, functions to detect generation and stop of electric discharge are mainly used. In the figure, the saturable reactor 113 is provided at a position close to the electrode 5 of the feeder lines 8A, 8B connecting the power source 7 to the electrode and that to the work 4 respectively. A saturable reactor having a low saturation current 1s, with a short average magnetic path length L of a core thereof, or with the large number of turns around a core is used as the saturable reactor 113. As a core of the saturable reactor actually used, eight pieces of amorphous cores each having an inner diameter of 2 mm, an outer diameter of 4 mm, and a length of 8 mm are used. The coaxial cable 114, resistor 115, DC power source 116, comparator 490, reference voltage 491, and a signal 492 indicating generation of electric discharge are the same as those shown in FIG. 1. A negative reference voltage 161 is inputted to a positive input terminal of a comparator 160, output from the coaxial cable 114 is inputted to a negative input terminal thereof, and output from the comparator 160 is outputted as a signal 162 indicating stop of electric discharge.

Figure 7:
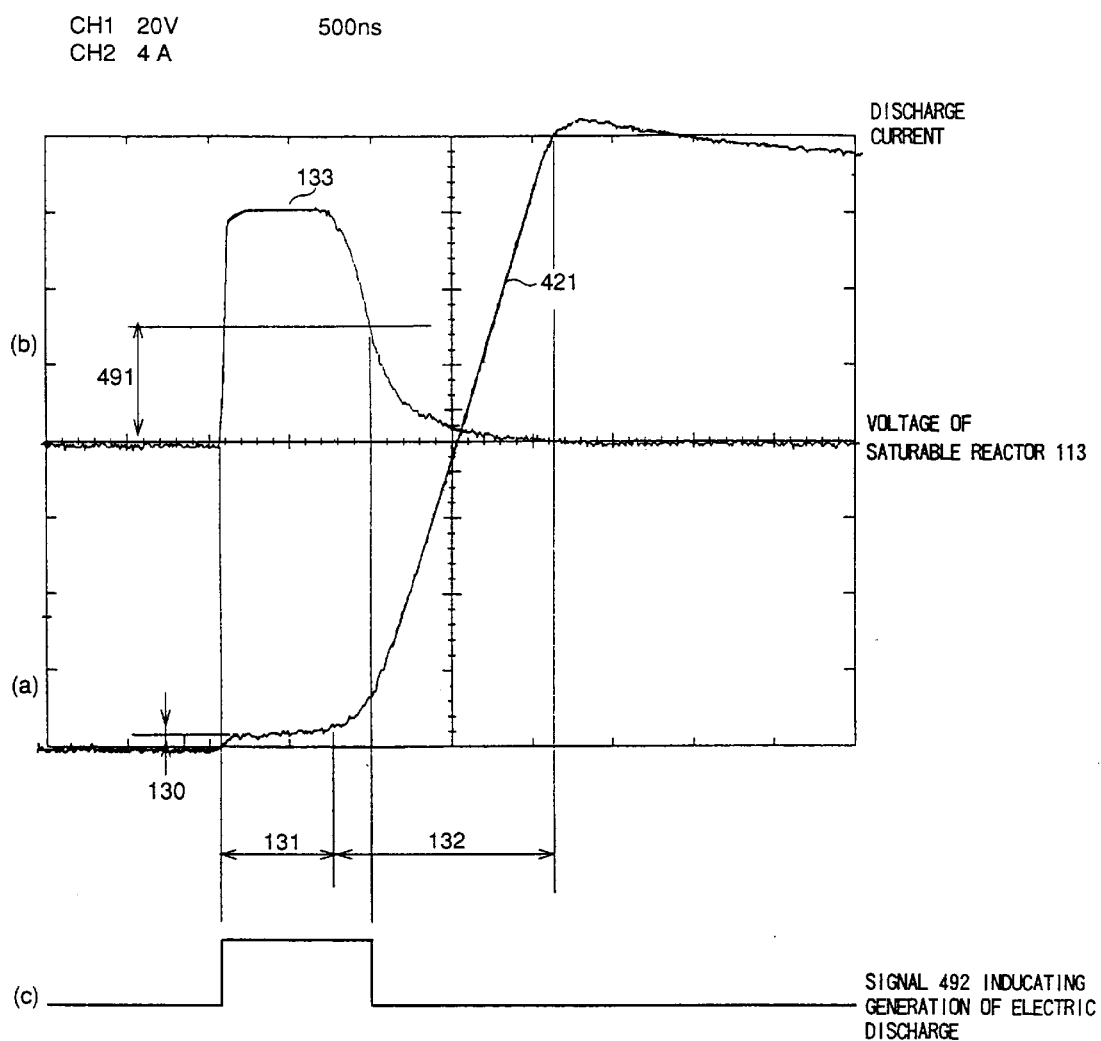
FIG. 7 is a waveform view for explanation of operations in the waveform control unit for the electric discharge machine according to Embodiment 2 of the present invention; and also

FIG. 7 shows enlarged waveforms of the voltage 133 generated in the saturable reactor 113 shown in FIG. 6 and of the discharge current 421 before and after the instant when electric discharge thereof is generated. When electric discharge is generated, a saturation current 130 decided according to a discharge current is in the saturable reactor 113 flows therein. In this case a current of about 1 A is maintained for about 700 nsec as shown in the period of time indicated at 131, then the discharge current 421 rises in a substantially linear form as shown in the period of time 132, and the gradient of this rise is substantially the same as that in a case where the saturable reactor 113 is not provided. The voltage 133 generated in the saturable reactor 113 is generated as shown in FIG. 7, so that the same amount of voltage is also generated at the positive input terminal of the comparator 490. (c) in FIG. 7 shows a signal indicating generation of electric discharge obtained by comparing this voltage to the reference voltage 491. The most important matter herein is that the discharge current 421 is a saturation current 130 so that only a slight amount of current flows therein for a while and the signal 492 indicating generation of electric discharge can be obtained before the discharge current 421 increases. Namely, as a control unit for an electric discharge machine, various types of control can be provided immediately before the discharge current 421 increases. In addition, there are some more excellent effects as that the saturable reactor 113 does not give any influence on the discharge current 421 after the signal 492 indicating generation of electric discharge is outputted and that a resonance current is little generated at the instant when electric discharge is generated.

Figure 8:
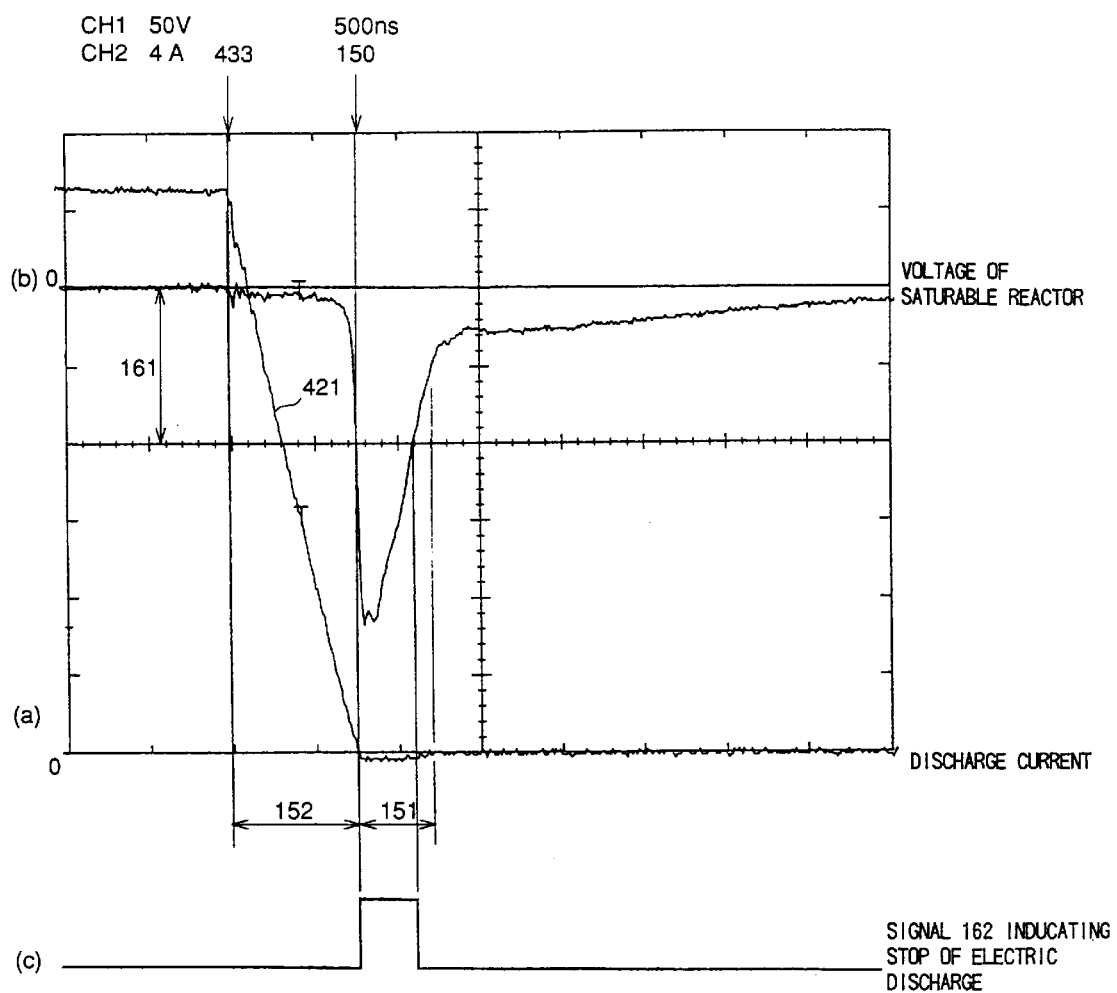
FIG. 8 is a waveform view for explanation of operations in the waveform control unit for the electric discharge machine according to Embodiment 2 of the present invention; and also
Figure 19:
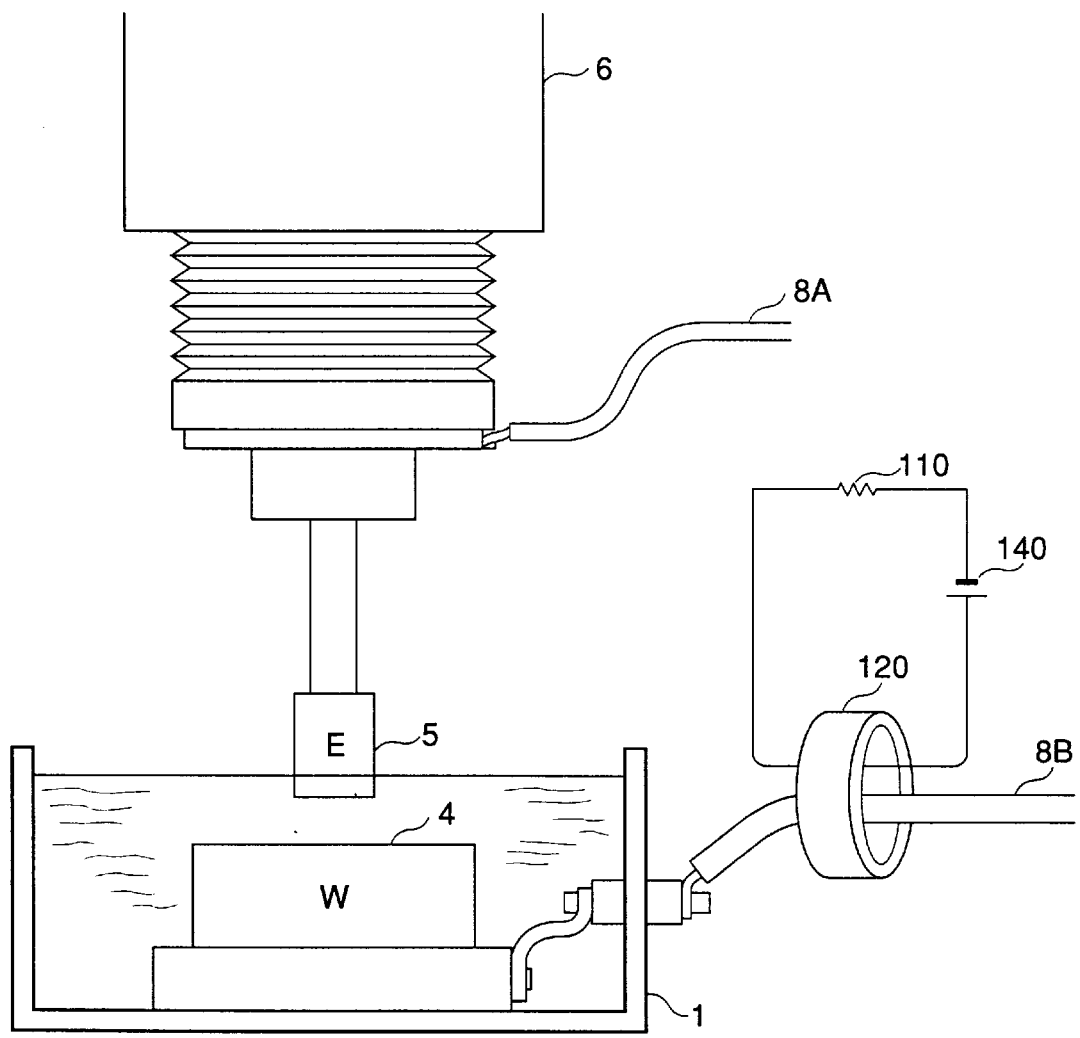
FIG. 19 is a waveform control unit for the electric discharge machine according to Embodiment 12 of the present invention.

FIG. 8 shows enlarged waveforms of the discharge voltage 133 and of the discharge current 421 between the electrode 5 and the work 4 shown in FIG. 6 and before and after the instant when electric discharge thereof is cut off. When the switching element $TR_2$ shown in FIG. 19 is turned OFF at the point of time 433, the discharge current 421 decreases in a gradient decided according to each inductance of the feeder lines 8A, 8B as well as to a voltage of the constant-voltage body $B_{20}$ shown in FIG. 1, and it becomes zero at the time indicated by 150. At this time, as shown at 434 in FIG. 29, the saturable reactor 113 prevents resonance of the static capacitance in the diodes $D_{22}$ or $D_{20}$ provided at the output of the power source 7 shown in FIG. 1 to each inductance of the feeder lines 8A, 8B because high impedance is generated in the feeder lines 8A, 8B, and also operates so that a reverse current does not flow therein. Namely, in the saturable reactor, a voltage in (b) is generated in the point of time indicated at 151, which prevents generation of a reverse current, so that only an extremely slight reverse current is generated in (a) for the period of time indicated at 151, and the resonance current 434 as shown in FIG. 29 is not found to occur therein. In the voltage of the saturable reactor in (b), a negative voltage is outputted for the period of time 151. A signal 162 indicating stop of electric discharge can be outputted by inputting this voltage into the negative input terminal of the comparator 160 and comparing it to the reference voltage 161. (c) in FIG. 8 shows this output. It is conventionally thought that electric discharge is stopped when a specified period of time has passed after the point of time when the switching element 433 is cut off, so that control is provided based on the idea as described above, however, if it is detected when electric discharge is stopped, a period of time until the next electric discharge is started can accurately be detected, and for this reason such a possibility that electric discharge is started during continuation of electric discharge will be eliminated and electric discharge machining with high precision can be controlled. There are also some more effects as that a point of time 152 to cut off a current is almost the same as that in a case where the saturable reactor 113 is not provided, that depletion of an electrode due to a reverse current can be reduced, and that the resonance voltage 432 as shown in FIG. 29 does not occur with noise suppressed and any malfunction due to noise given to other controllers can also be decreased.

Figure 9:
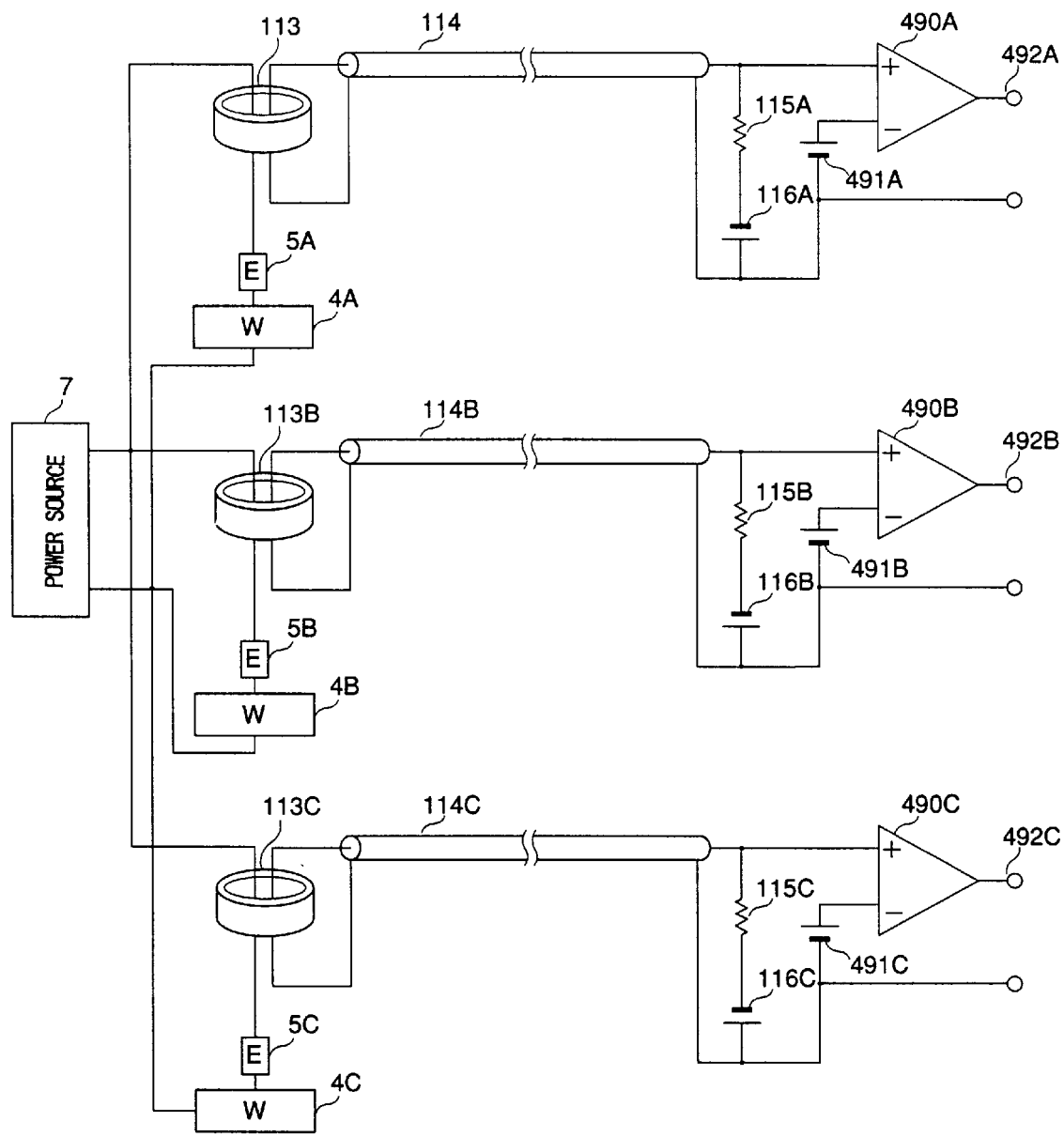
FIG. 9 shows a waveform control unit for the electric discharge machine according to Embodiment 3 of the present invention; and also

FIG. 9 shows a waveform control unit for an electric discharge machine according to Embodiment 3 of the present invention.

In FIG. 9, electric-discharge generation detectors each using the saturable reactor shown in FIG. 6 are provided in feeder lines connecting the same power source 7 to three pieces of electrodes 5A, 5B, 5C as well as to works 4A, 4B, 4C respectively. Although each operation is the same as that in Embodiment 2 shown in FIG. 6, the point that a plurality of electrodes and a plurality of works are provided in Embodiment 3 is different from that in the previous embodiments. As described in the section 5 of Prior Art, electric discharge is generated only in any one of the electrodes, so that if each generation of electric discharge in the plurality of electrodes can be detected, important signals indicating a state of electric discharge machining or a feeding speed of an electrode or the like each required when the electric discharge machine is controlled can be obtained. It was impossible to detect generation of electric discharge in electrodes each time the electric discharge is generated in the conventional type of method of detecting generation of electric discharge by detecting a discharge voltage, and for this reason a plurality of electrodes and works could not be machined by the same power source. With the method according to this embodiment, a plurality of electrodes and works can be machined by the same power source, so that cost of the power source can be reduced.

Figure 10:
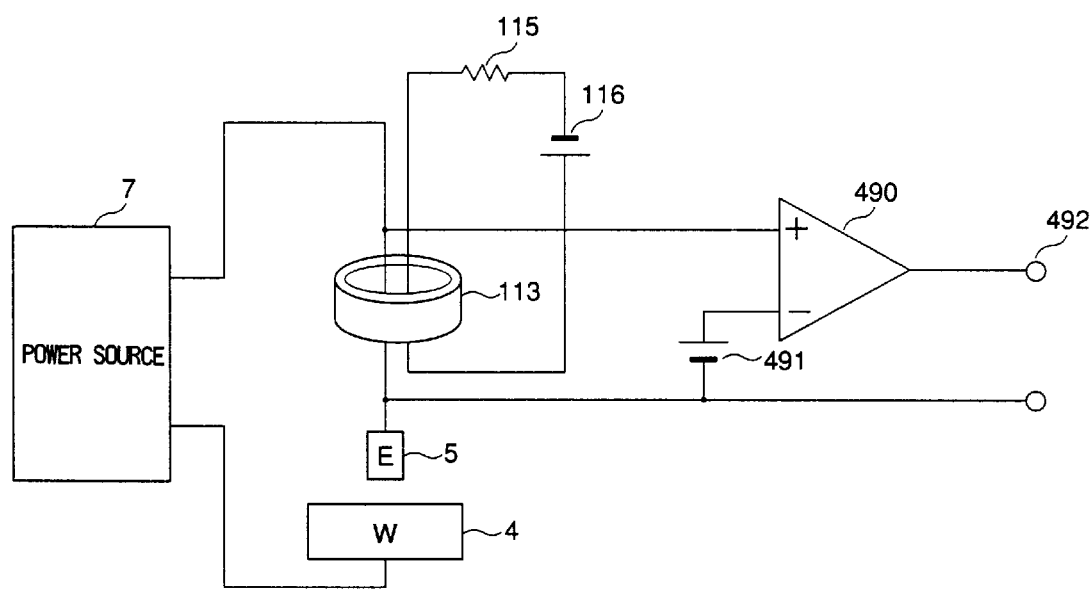
FIG. 10 is a waveform control unit for the electric discharge machine according to Embodiment 4 of the present invention.

FIG. 10 shows a waveform control unit for an electric discharge machine according to Embodiment 4 of the present invention.

In FIG. 10, an electric-discharge generation detector using the saturable reactor shown in FIG. 6 is provided on a feeder line of a saturable reactor 113 and an input terminal of the comparator 490 is directly connected to the feeder line thereof. In the connection as described above, the same effect can be obtained as that in Embodiment 2.

Figure 11:
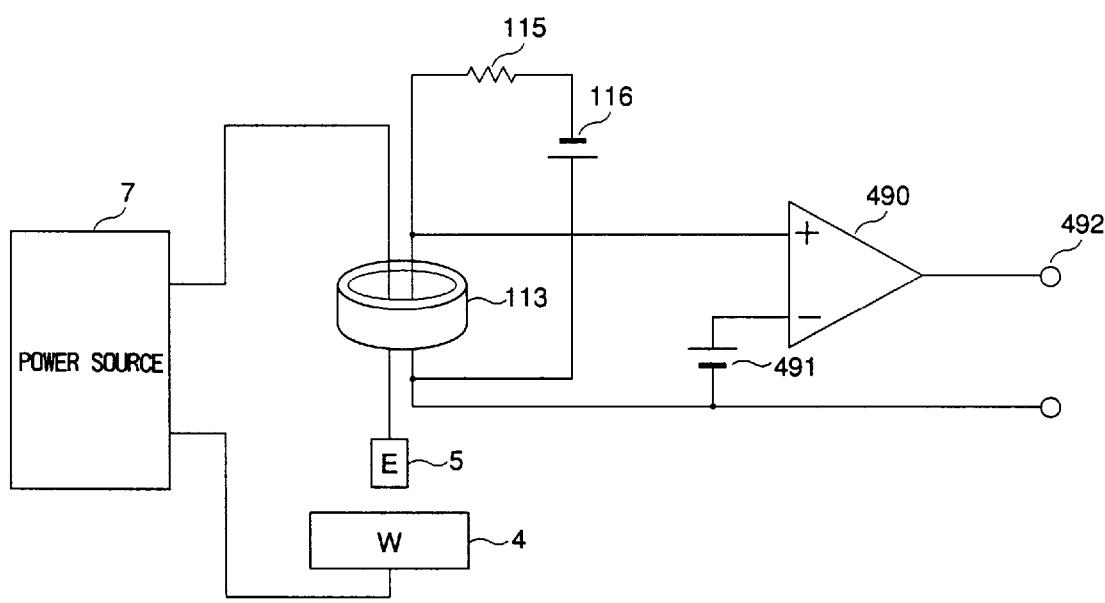
FIG. 11 is a waveform control unit for the electric discharge machine according to Embodiment 5 of the present invention.

FIG. 11 shows a waveform control unit for an electric discharge machine according to Embodiment 5 of the present invention.

In FIG. 11, an electric-discharge generation detector using the saturable reactor shown in FIG. 6 is provided on a feeder line, a coil separate from the feeder line thereof with a resistor 115 as well as with a DC power source 116 serially connected to the coil is provided around the detector, and the input terminal of the comparator 490 is directly connected to the coil so that the detector is excited reversely to a discharge current. In the connection as described above, the same effect can be obtained as that in Embodiment 2.

Figure 12:
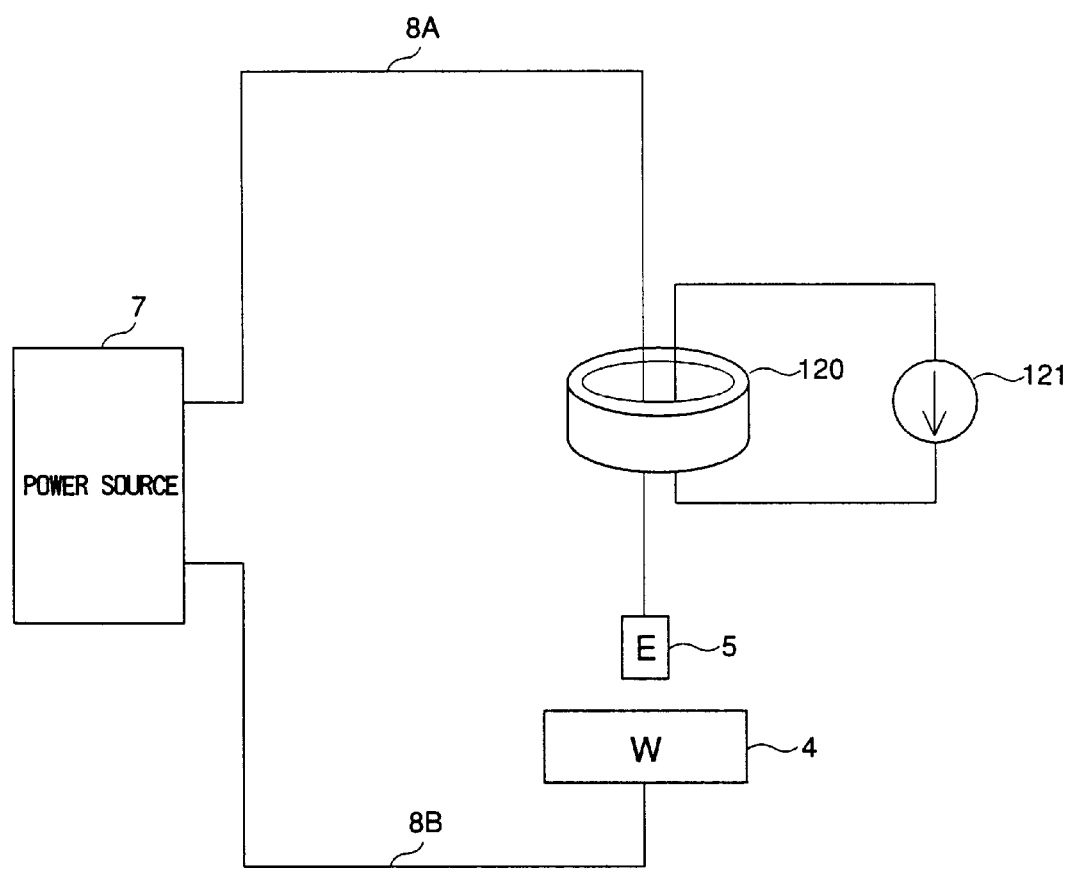
FIG. 12 is a waveform control unit for the electric discharge machine according to Embodiment 6 of the present invention; and also

FIG. 12 shows a waveform control unit for an electric discharge machine according to Embodiment 6 of the present invention.

FIG. 12 is a view showing the simplest configuration for explanation of the operation according to the present invention. As a saturable reactor 120, at least one piece thereof, a plurality of saturable reactors each having a different magnetic path length, a saturable reactor with a form having a large width in the central section in the axial direction and with a slender form at position closer to the outer diameter thereof, a plurality of saturable reactors each having the different number of turns of feeder line therearound or the like are used, and a constant current source 121 for exciting the saturable reactor in the direction reverse to that of the discharge current is provided on a feeder line. The constant current source 121 may comprise a resistor and a DC power source. With such simple configuration, the increase curve of a discharge current immediately after electric discharge is generated as shown in the curve 421 in FIG. 3 can be controlled to an arbitrary curve by combining any of the saturable reactors. As described above, the various effects which are specific thereto can be achieved.

Figure 13:
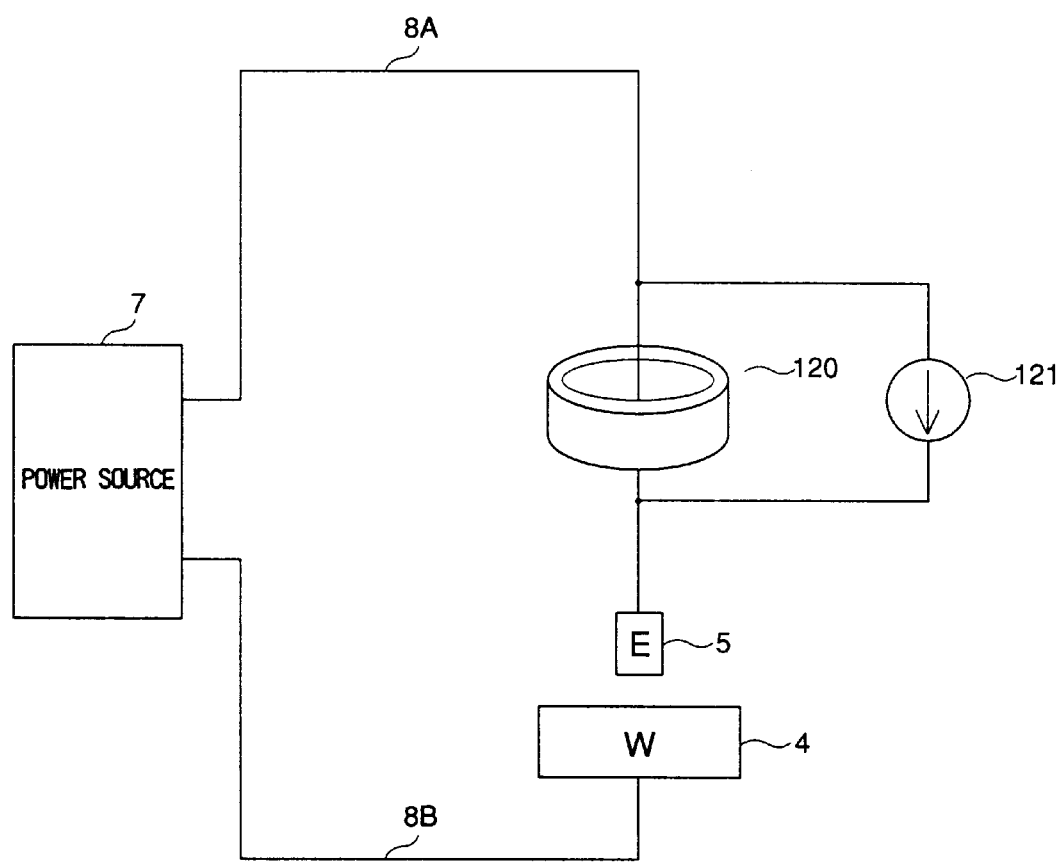
FIG. 13 is a waveform control unit for the electric discharge machine according to Embodiment 7 of the present invention.

FIG. 13 shows a waveform control unit for an electric discharge machine according to Embodiment 7 of the present invention.

In FIG. 13, the constant current source 121 is directly connected to a feeder line of the machining current control unit for the electric discharge machine using the saturable reactor shown in FIG. 12, and the same effect can be obtained as that in Embodiment 6.

Figure 14:
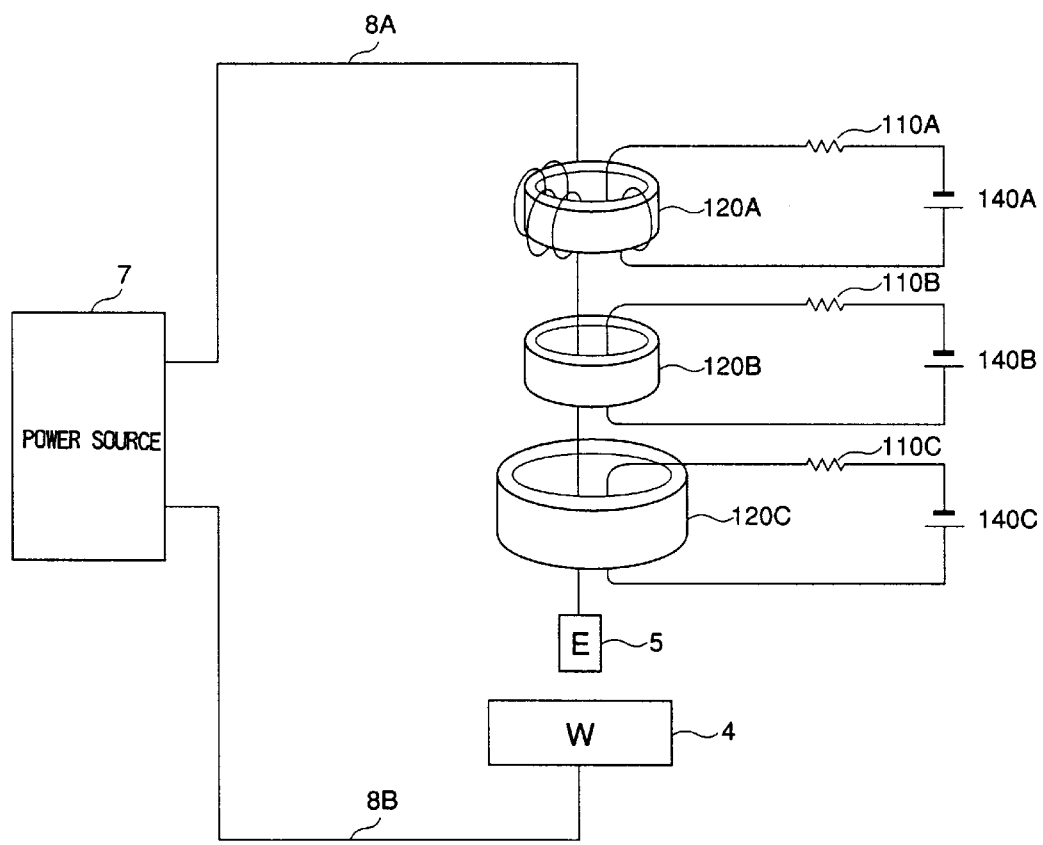
FIG. 14 is a waveform control unit for the electric discharge machine according to Embodiment 8 of the present invention.

FIG. 14 shows a waveform control unit for an electric discharge machine according to Embodiment 8 of the present invention.

In FIG. 14, the saturable reactor 120 of the machining current control unit for the electric discharge machine using the saturable reactor shown in FIG. 12 comprises a plurality of saturable reactors 120A, 120B, 120C each having the different number of turns N of core therearound or each having a different magnetic path length L, and coils each separate from the feeder line 8A with resistors 110A, 110B, 110C and DC power sources 140A, 140B, 140C each serially connected to each of the coils are inserted into each of the reactors, so that the reactors are excited in the direction reverse to that of each discharge current, and the same effect can be obtained as that in Embodiment 6.

Figure 15:
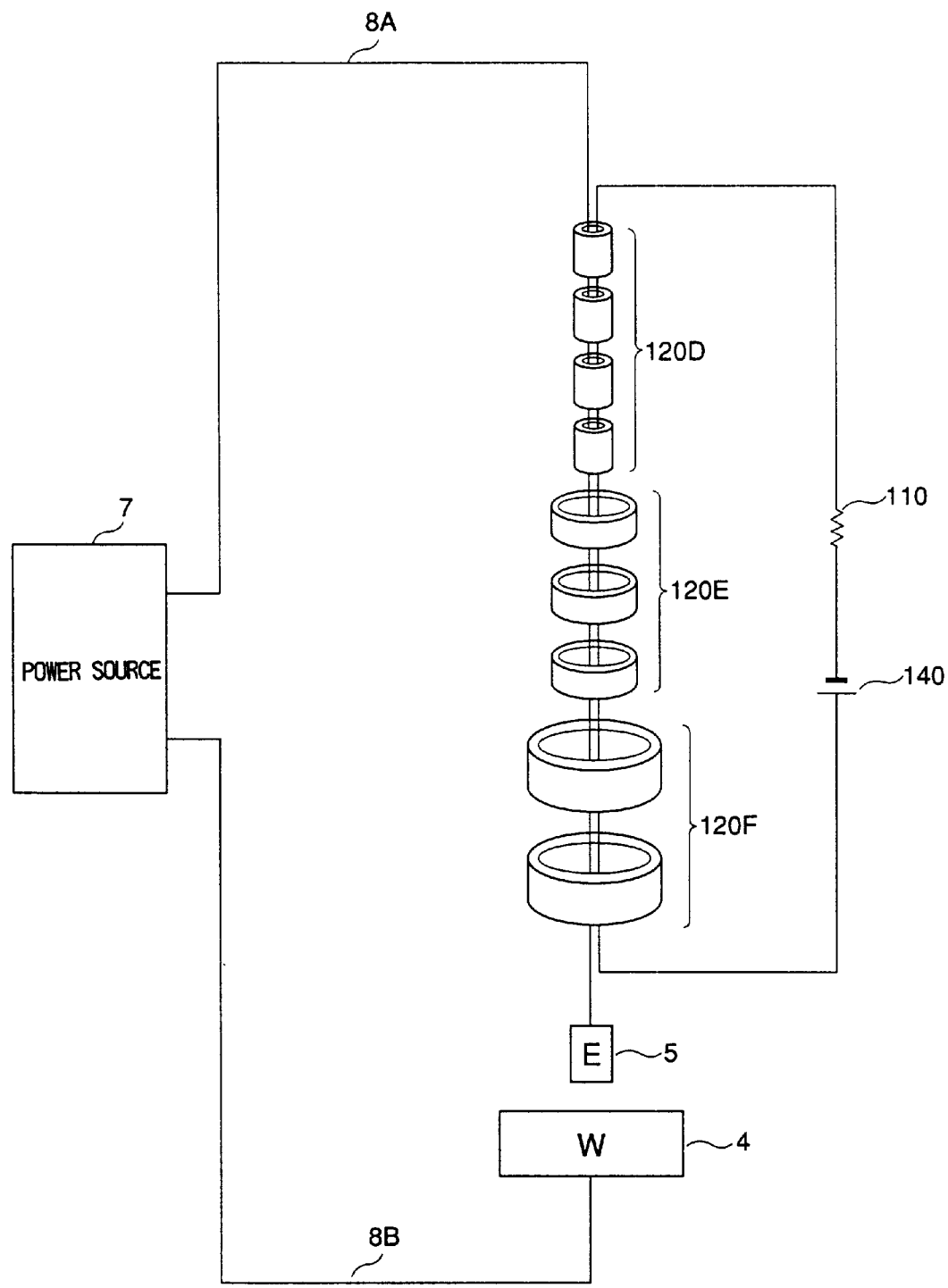
FIG. 15 is a waveform control unit for the electric discharge machine according to Embodiment 9 of the present invention.

FIG. 15 shows a waveform control unit for an electric discharge machine according to Embodiment 9 of the present invention.

In FIG. 15, the saturable reactor 120 of the machining current control unit for the electric discharge machine using the saturable reactor shown in FIG. 12 comprises a plurality of saturable reactors 120D, 120E, 120F each having a different average magnetic path length L of cores or each having a different cross-sectional area S of each core, and a coil separate from the feeder line 8A with a resistor 110 and a DC power source 140 serially connected to the coil is inserted into the reactors, so that the reactors are excited in the direction reverse to that of a discharge current. The components actually used therein are a resistor 110 with resistance of 500 Ω, a DC power source 140 of 87 V, four pieces of cobalt-based amorphous cores for the saturable reactor 120D each having an inner diameter of 2 mm, an outer diameter of 4 mm, and a length of 8 mm, three pieces of cobalt-based amorphous cores for the saturable reactor 120E each having an inner diameter of 7 mm, an outer diameter of 10 mm, and a length of 4.5 mm, and two pieces of cobalt-based amorphous cores for the saturable reactor 120F each having an inner diameter of 14 mm, an outer diameter of 21 mm, and a length of 4.5 mm, and an increase curve of the discharge current is the same as that indicated by the reference numeral 421 in FIG. 3. The same effect in Embodiment 9 can be obtained as that in Embodiment 6.

Figure 16:
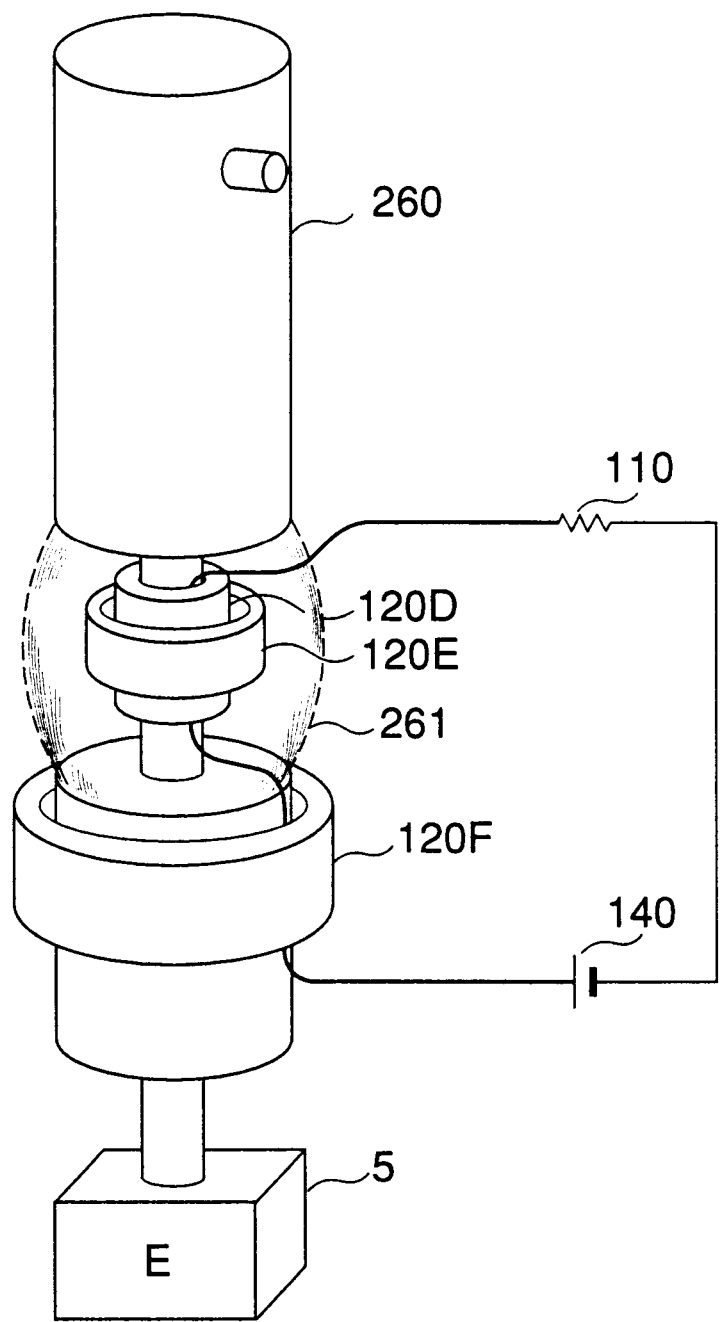
FIG. 16 is a waveform control unit for the electric discharge machine according to Embodiment 10 of the present invention.

FIG. 16 shows a waveform control unit for an electric discharge machine according to Embodiment 10 of the present invention.

Figure 17:
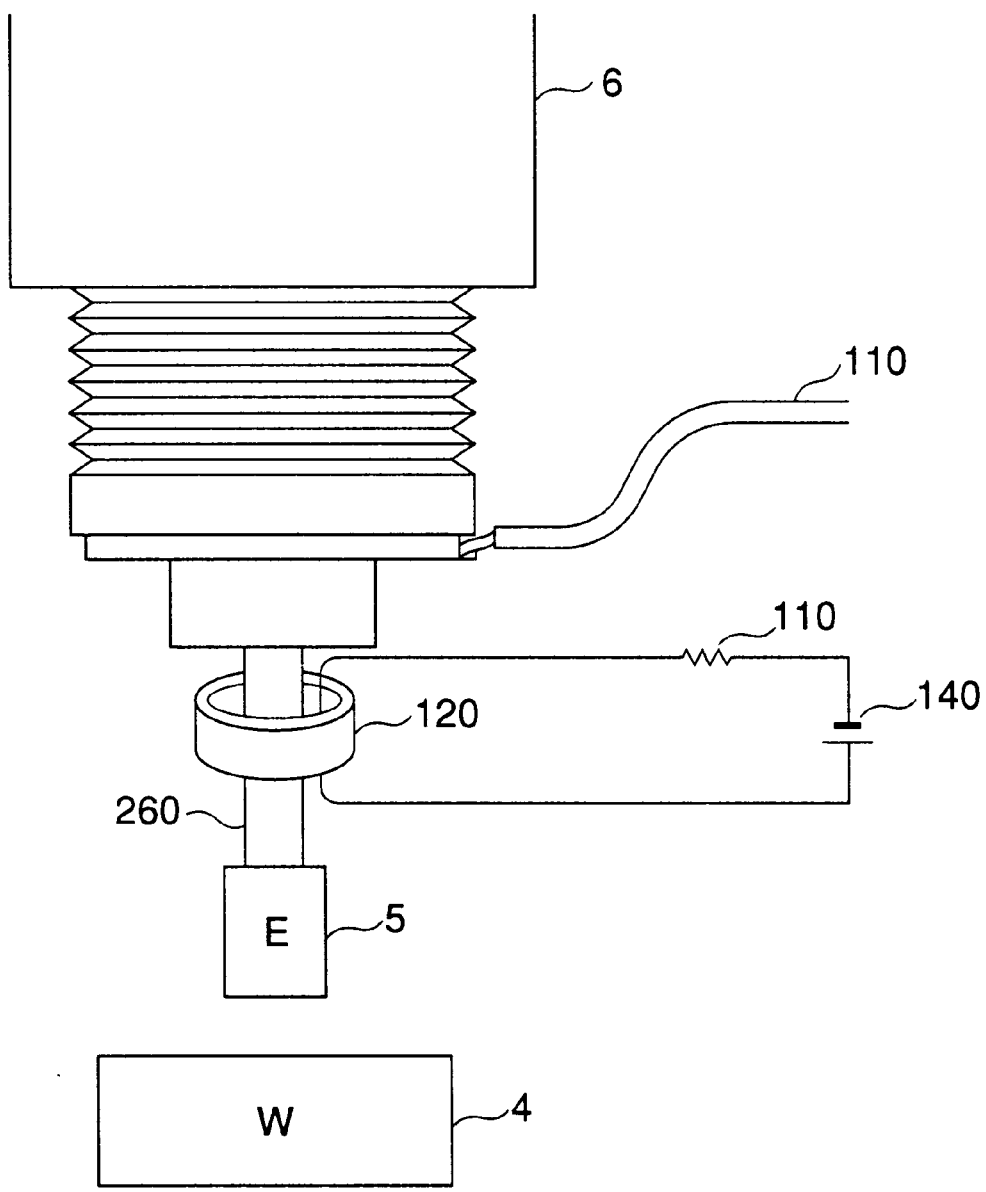
FIG. 17 is a waveform control unit for the electric discharge machine according to Embodiment 10 of the present invention; and also

As an actual example according to Embodiment 9 shown in FIG. 15, the saturable reactor 120D or 120E having a small inner diameter is provided in a slender portion of a tool 260 for attaching an electrode 5 to an electrode feeding means 6 and mechanical strength is maintained by an insulating support 261 made of ceramic, glass, or plastics or the like, and the tool 260 is penetrated into the saturable reactor 120F having a large inner diameter, whereby the same effect can be achieved as that in Embodiment 6. FIG. 17 shows an actual state in which each of the components described in Embodiment 10 is attached to the electrode feeding means 6. With Embodiment 10, a saturation current 1s and a current increase curve or the like can be matched to each of electrodes, so that, if the electrode 5 together with the tool 260 is exchanged with another one, it is possible to obtain a waveform control unit for the electric discharge machine which can be matched to each of machining conditions not only for a small electrode, but also for a large electrode.

Figure 18:
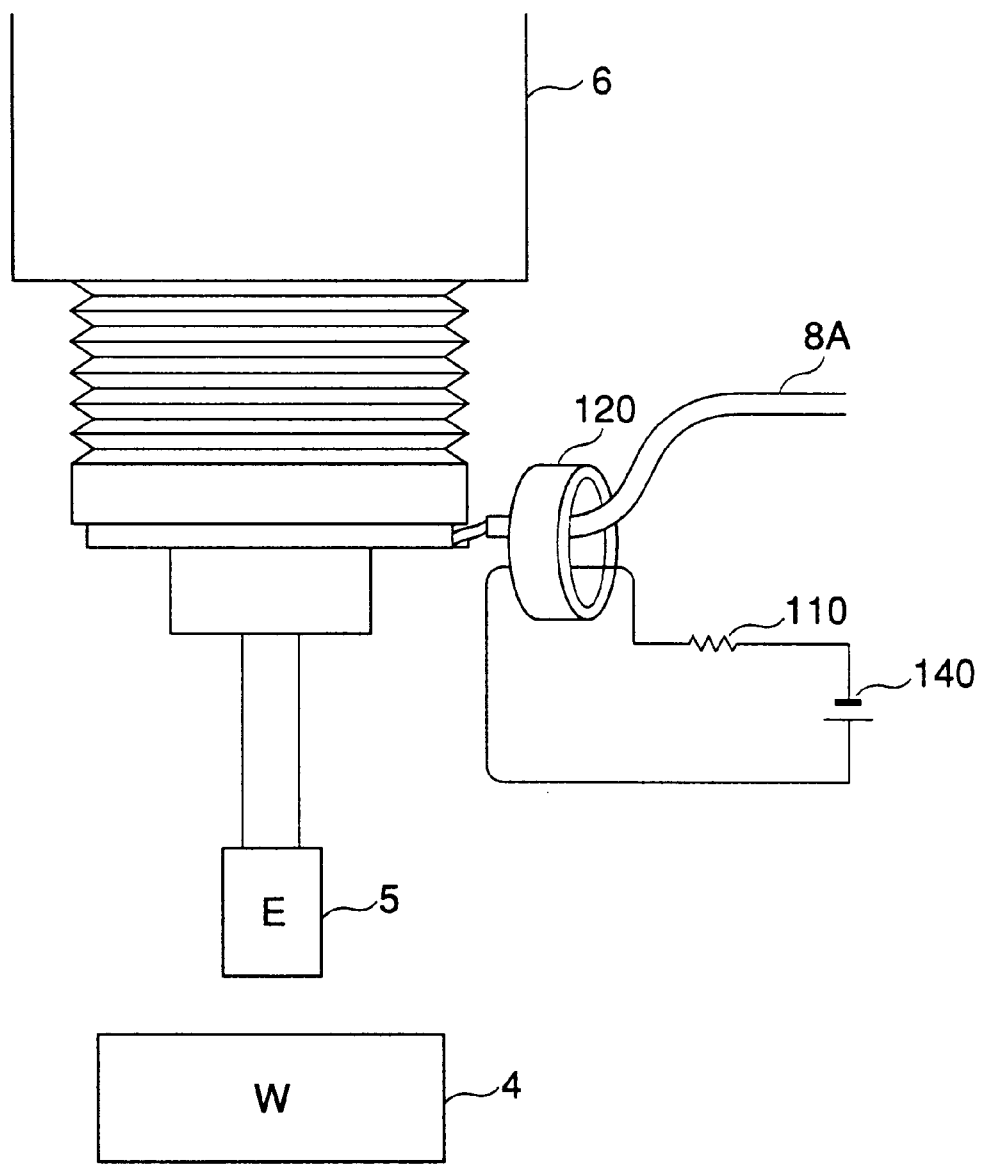
FIG. 18 is a waveform control unit for the electric discharge machine according to Embodiment 11 of the present invention.

FIG. 18 is a view showing the waveform control unit for the electric discharge machine according to Embodiment 6 which is provided in a position close to the feeder line 8A to the electrode 5, and the same effect can be obtained as that in Embodiment 6.

FIG. 19 is a view showing the waveform control unit for the electric discharge machine according to Embodiment 6 which is provided at a position close to the work 4 on the feeder line 8B, and the same effect as that in Embodiment 6 can be obtained.

Figure 20:
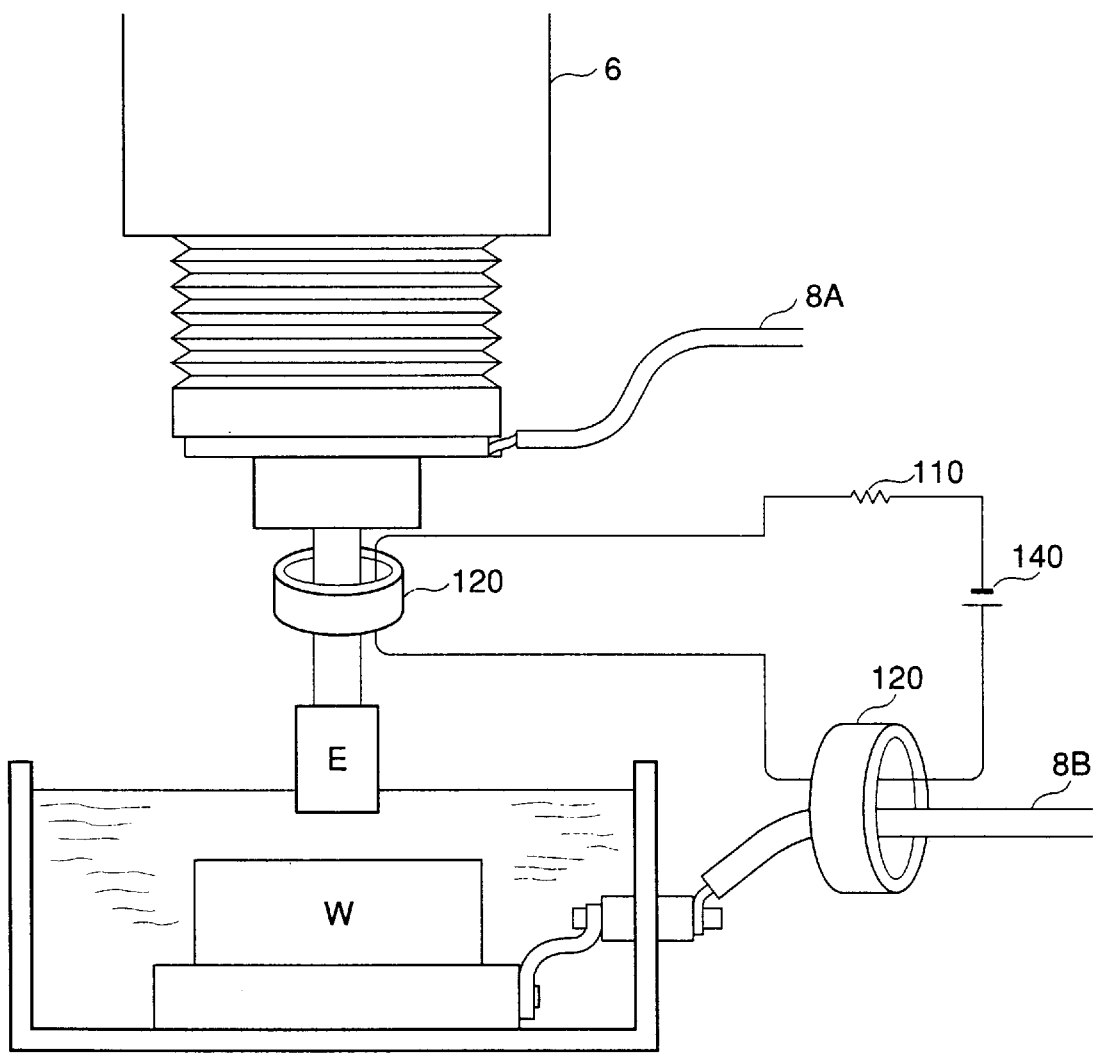
FIG. 20 is a waveform control unit for the electric discharge machine according to Embodiment 13 of the present invention.

FIG. 20 is a view showing the waveform control units in the electric discharge machine according to Embodiment 6 one of which is provided at a position close to the feeder line 8A to the electrode 5 and the other one is provided in a position close to the work 4 on the feeder line 8B, and the same effect as that in Embodiment 6 can be obtained.

Figure 21:
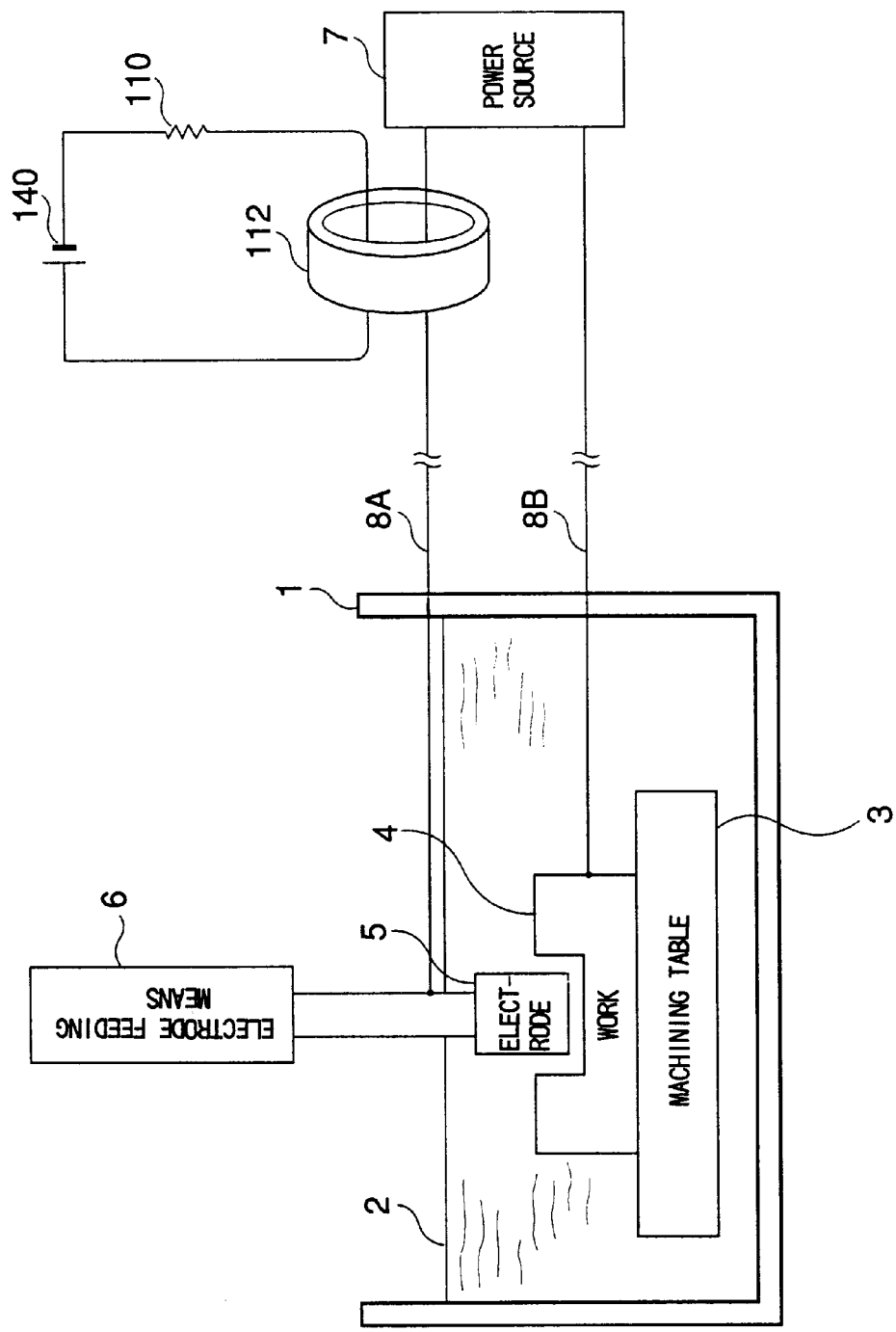
FIG. 21 is a waveform control unit for the electric discharge machine according to Embodiment 14 of the present invention.

FIG. 21 is a view showing the waveform control unit for the electric discharge machine according to Embodiment 6 which is provided at a position close to the power source 7 on the feeder line 8A to the electrode 5, and the same effect can be obtained as that in Embodiment 6.

Figure 22:
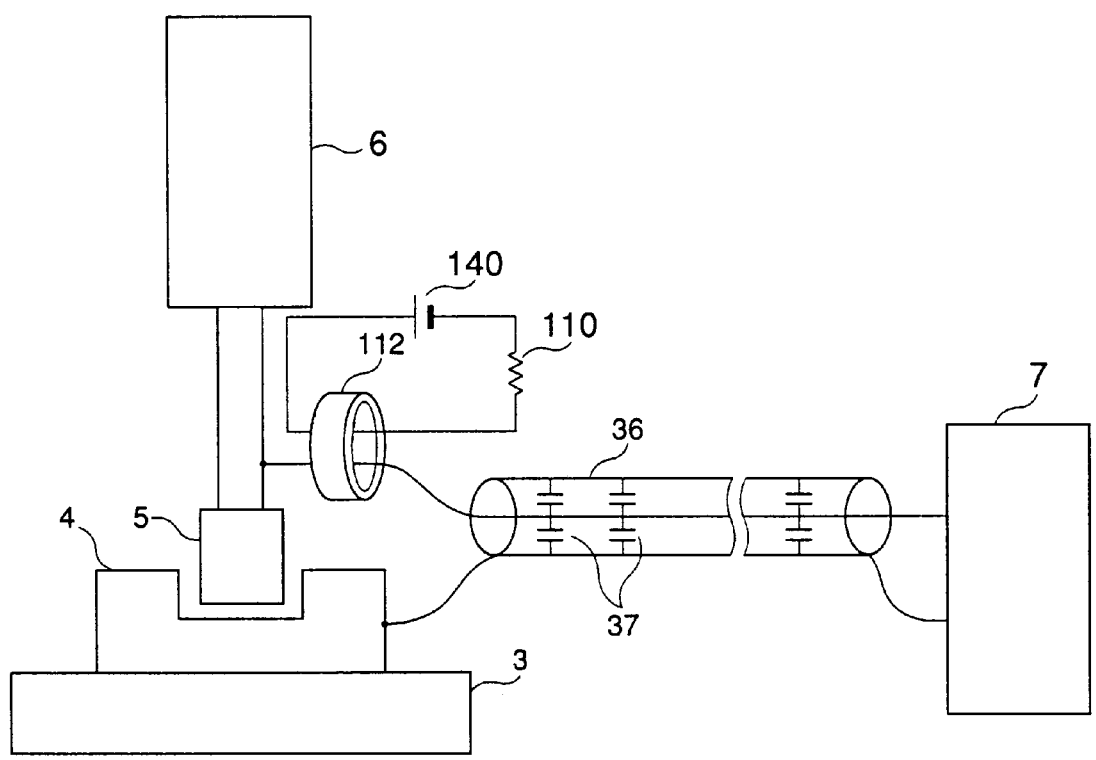
FIG. 22 is a waveform control unit for the electric discharge machine according to Embodiment 15 of the present invention.
Figure 32:
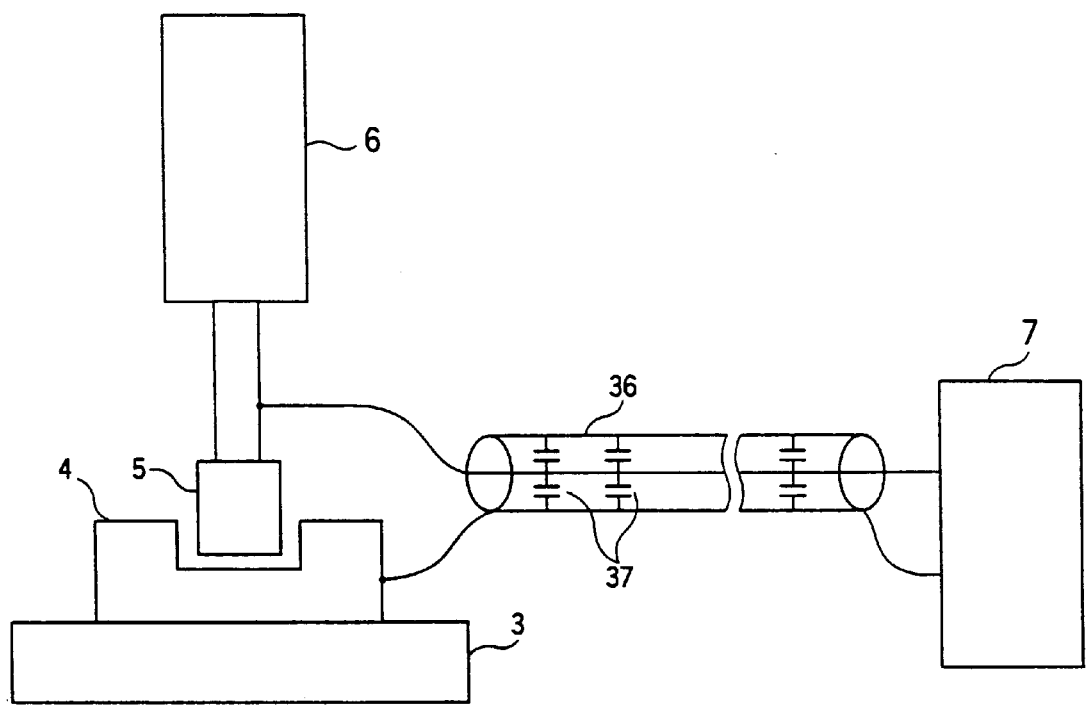
FIG. 32 is a block diagram for explanation of operations in the power supply unit for the electric discharge machine based on the conventional technology.
Figure 33:
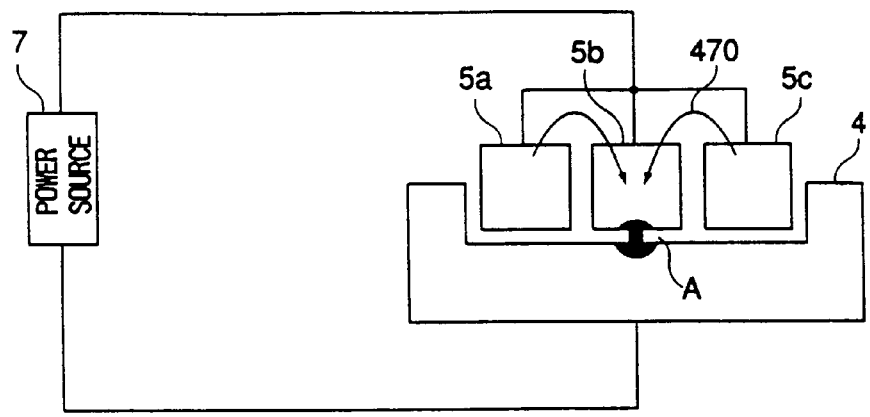
FIG. 33 is a block diagram for explanation of operations in the power supply unit for the electric discharge machine based on the conventional technology.
Figure 34:
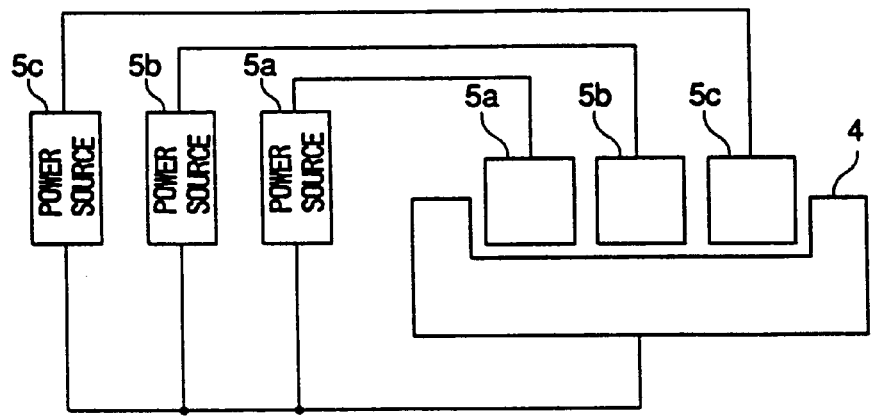
FIG. 34 is a block diagram for explanation of operations in the power supply unit for the electric discharge machine based on the conventional technology.
Figure 37:
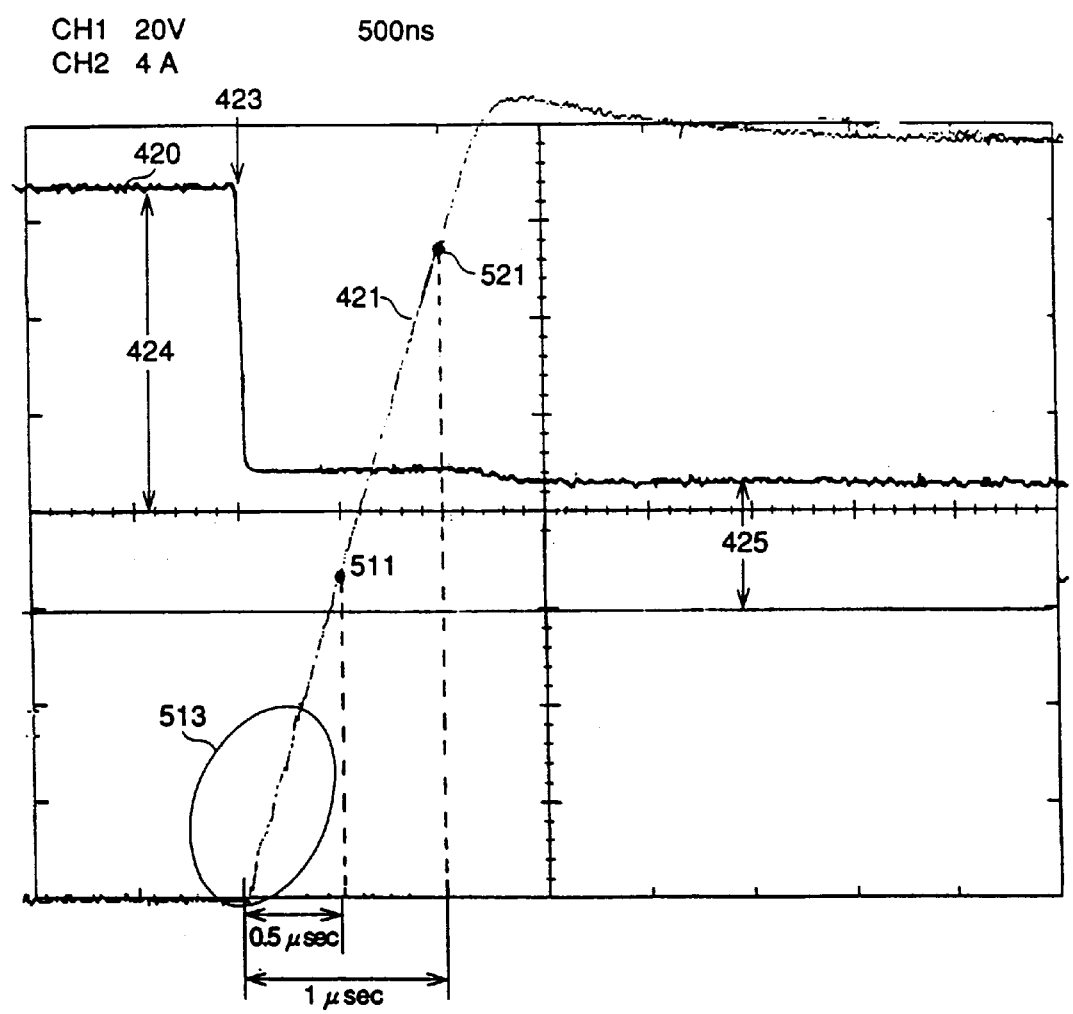
FIG. 37 is a waveform view for explanation of operations in the power supply unit for the electric discharge machine based on the conventional technology.
Figure 38:
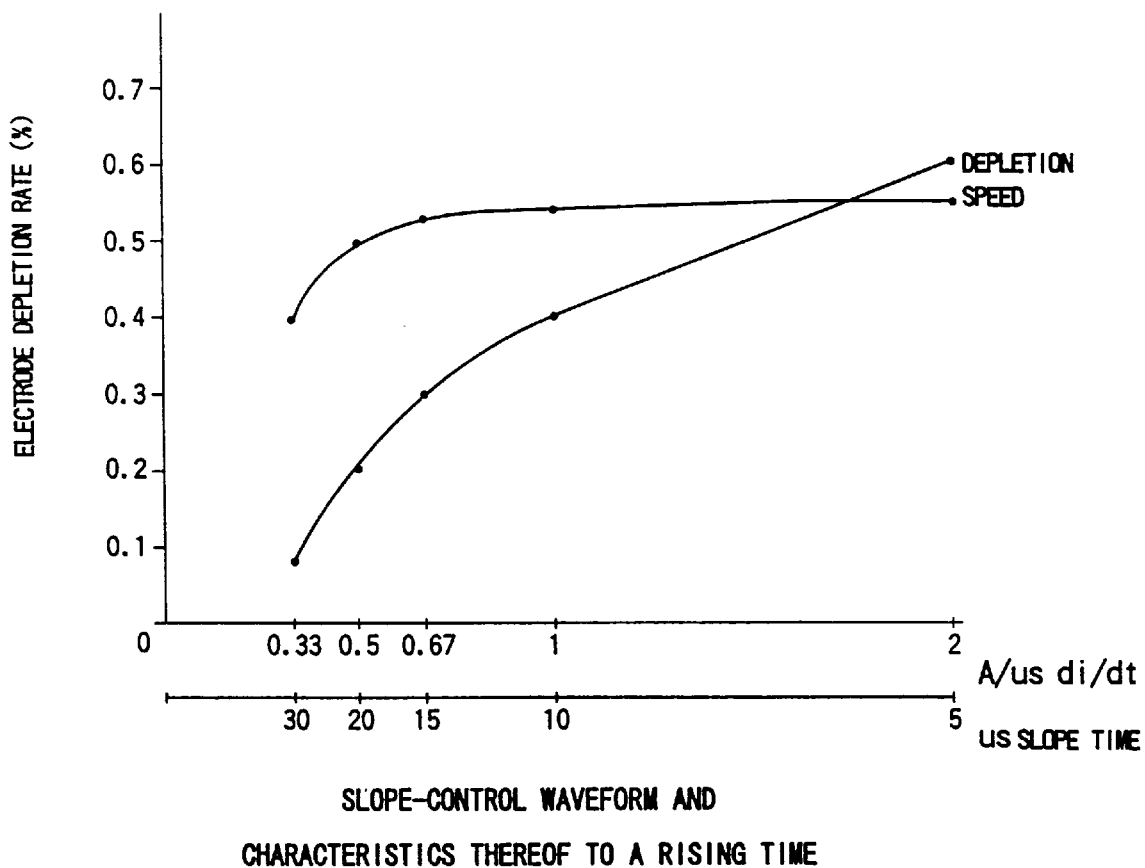
FIG. 38 is a view for explanation of operations in the power supply unit for the electric discharge machine based on the conventional technology.

FIG. 22 shows a power supply unit for the electric discharge machine using a coaxial cable 36 for a feeder line described in FIG. 32 in the section 4 of Prior Art and also shows the waveform control unit for the electric discharge machine according to Embodiment 6 which is provided at a position close to the electrode 5, and the same effect can be obtained as that in Embodiment 6. Also performance of the electric discharge is improved so that the waveform control unit is not affected by a static capacitance 37 therein even if the coaxial cable 36 is used, and inductance in wiring is reduced by using a coaxial cable for wiring, which makes a response to a machining current quicker, and a machining speed is improved. Feeding power through the coaxial cable 36 can improve the performance of a power supply unit for an electric discharge machine providing such effects as improvement of a machining speed, possibility of micromachining, machining with a large machining current in a large electrode, prevention of noise from being irradiated to the outside, or realization of feeding power from a far remote place, whereby machining performance of an electric discharge machine can dramatically be enhanced.

Figure 23:
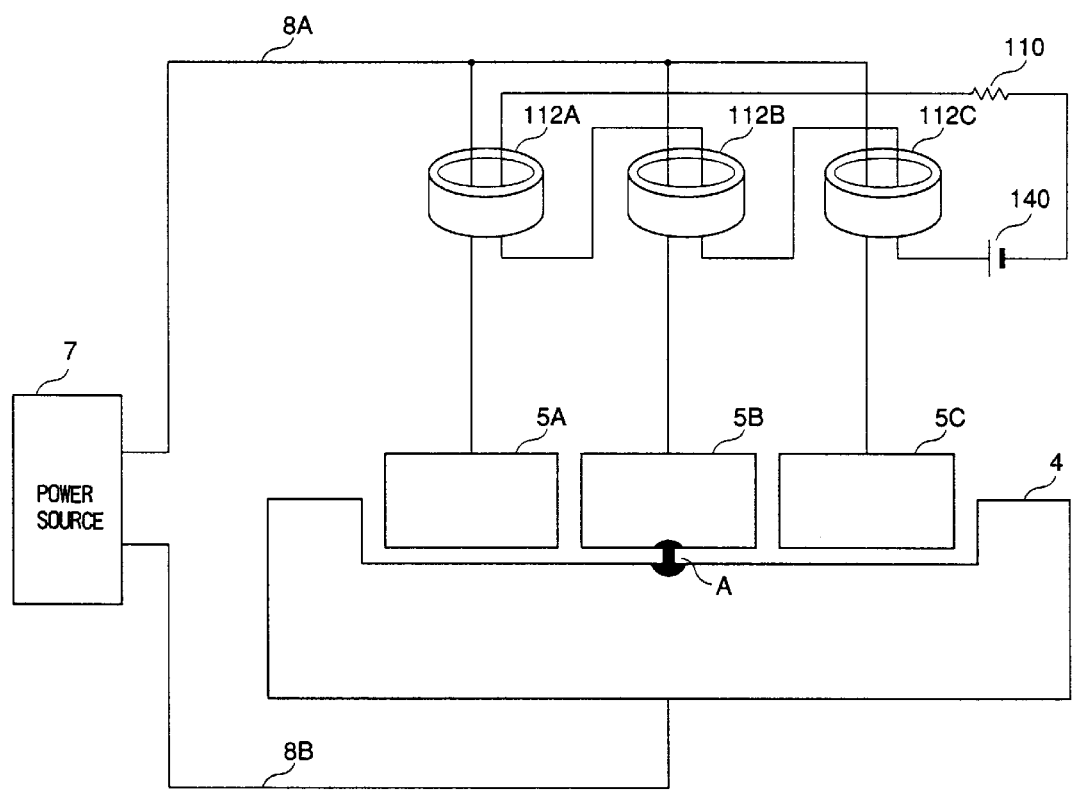
FIG. 23 is a waveform control unit for the electric discharge machine according to Embodiment 16 of the present invention.

FIG. 23 shows connection of the plurality of electrodes 5A, 5B, 5C and a work 4 to a common power source 7, which was described in the section 5 of Prior Art. Saturable reactors 112A, 112B, 112C are provided on feeder lines to electrodes 5A, 5B, 5C respectively, coils different from the feeder lines are serially connected to each other, and a resistor 110 and a DC power source 140 are serially connected to the coil so that the saturable reactors 112A, 112B, 112C are excited in the direction reverse to that of the excitation due to a discharge current. If connection is executed as described above, in a case where electric discharge is generated in the electrode 5B, electrical charge accumulated in a static capacitance between the electrode 5A and the work 4 as well as in a static capacitance between the electrode 5C and the work 4 can act for preventing a current reverse to a discharge current according to the saturable reactors 112A, 112C, so that there is only a slight amount of current flowing into an electric discharge generating point A. An amount of this current is also the same as that described above even if more number of electrodes are provided therein. As described above, even if a plurality of electrodes are connected to the power source and electric discharge machining is executed, a small amount of the surge current 450 shown in FIG. 31 flows therein, which does not cause substantial depletion of the electrodes. Namely, machining can be executed by connecting a plurality of electrodes 5 to each other through one piece of power source 7, which makes it possible to realize electric discharge machining in a large area with high-precision as well as low-cost.

Figure 24:
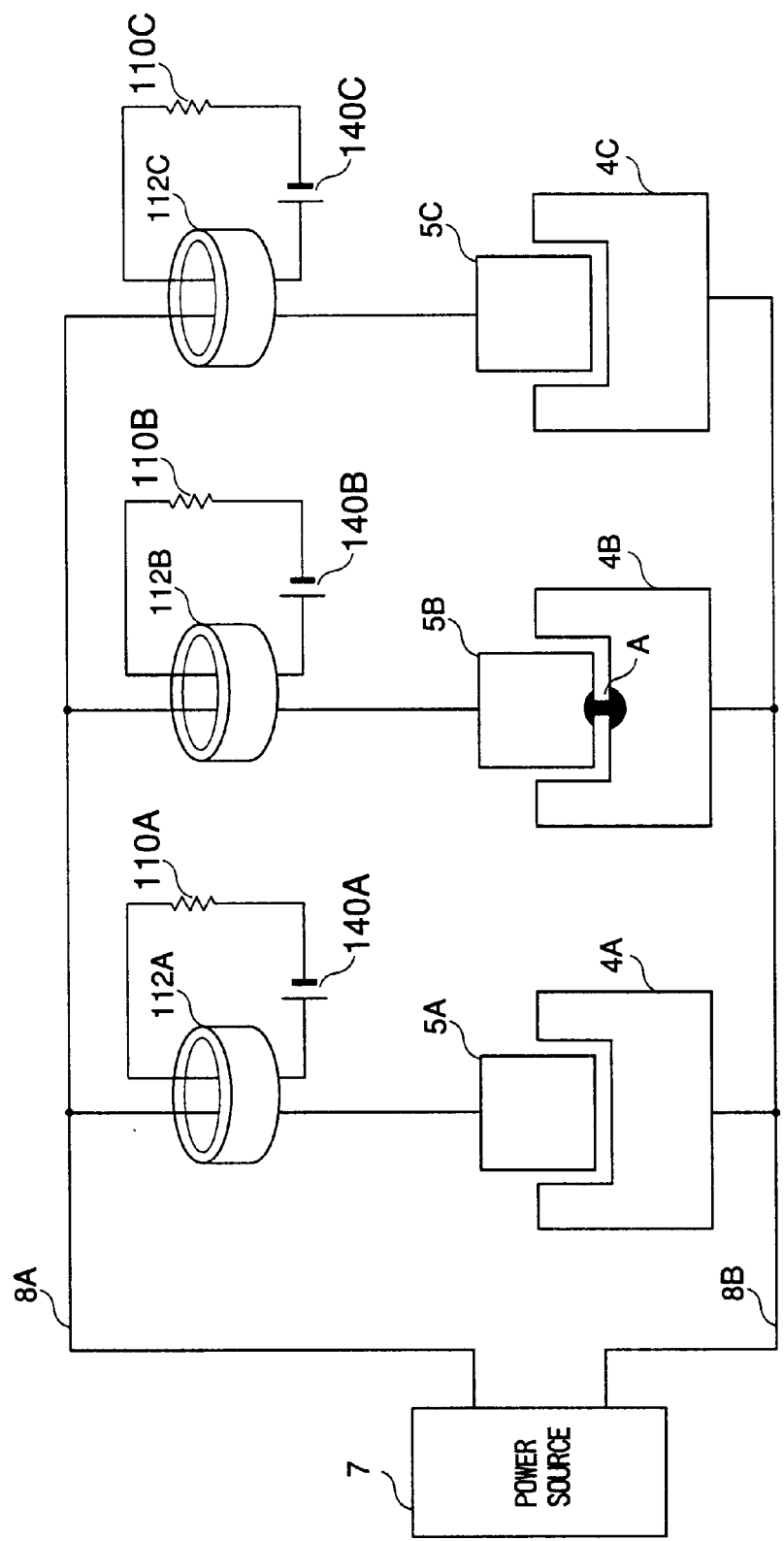
FIG. 24 is a waveform control unit for the electric discharge machine according to Embodiment 17 of the present invention.

FIG. 24 shows an embodiment in a case where a plurality of machining devices each comprising an electrode feeding means 6 and a machining liquid vessel 1 which are not shown herein are provided therein and also shows connection of the plurality of the electrodes 5A, 5B, 5C and a plurality of works 4a, 4B, 4C to the common power source 7. The saturable reactors 112A, 112B, 112C are provided on feeder lines to the electrodes 5A, 5B, 5C, respectively, coils separate from the feeder lines, resistors 110A, 110B, 110C, and DC power sources 140A, 140B, 140C are serially connected to each other respectively as shown in the figure so that each of the saturable reactors is excited in the direction reverse to that of a discharge current. If the connection is executed as described above, in a case where electric discharge is generated in the electrode 5B, electrical charge accumulated in a static capacitance between the electrode 5A and the work 4A as well as in a static capacitance between the electrode 5C and the work 4C can act for preventing a current reverse to a discharge current according to the saturable reactors 112A, 112C, so that there is only a slight amount of current flowing into an electric discharge generating point A. An amount of this current is also the same as that described above even if more number of electrodes are provided therein. As described above, even if electric discharge machining is executed by connecting a plurality of electrodes to the power source, a small amount of the surge current 450 as shown in FIG. 31 flows therein, which prevents remarkable depletion of the electrodes. Namely, machining can be executed by connecting electrodes 5 in a plurality of machining devices to works 4 therein with one piece of power source 7, so that a plurality of works each having a different form can concurrently be machined with the same one power source 7.

Figure 25:
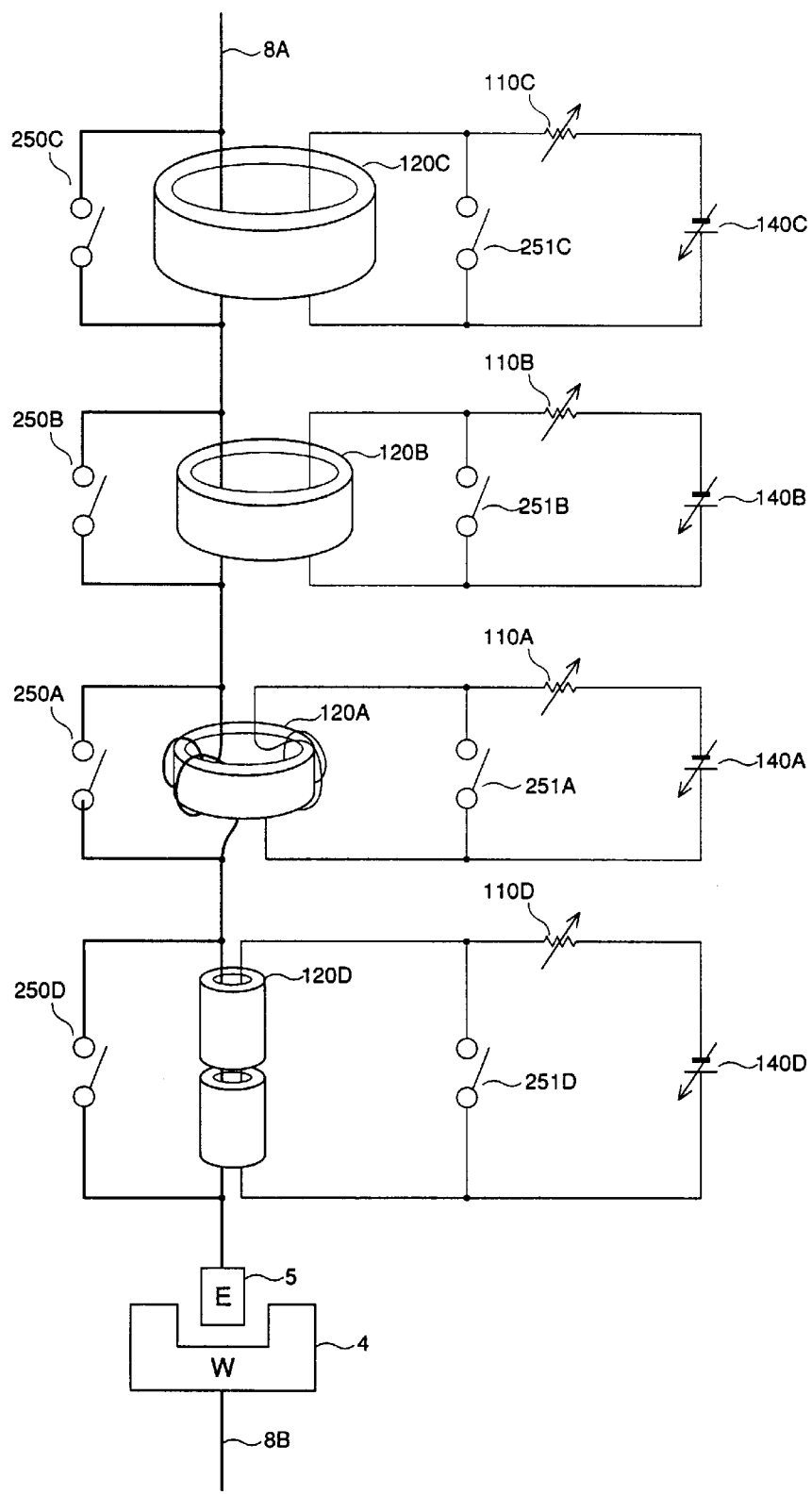
FIG. 25 is a waveform control unit for the electric discharge machine according to Embodiment 18 of the present invention.
Figure 26:
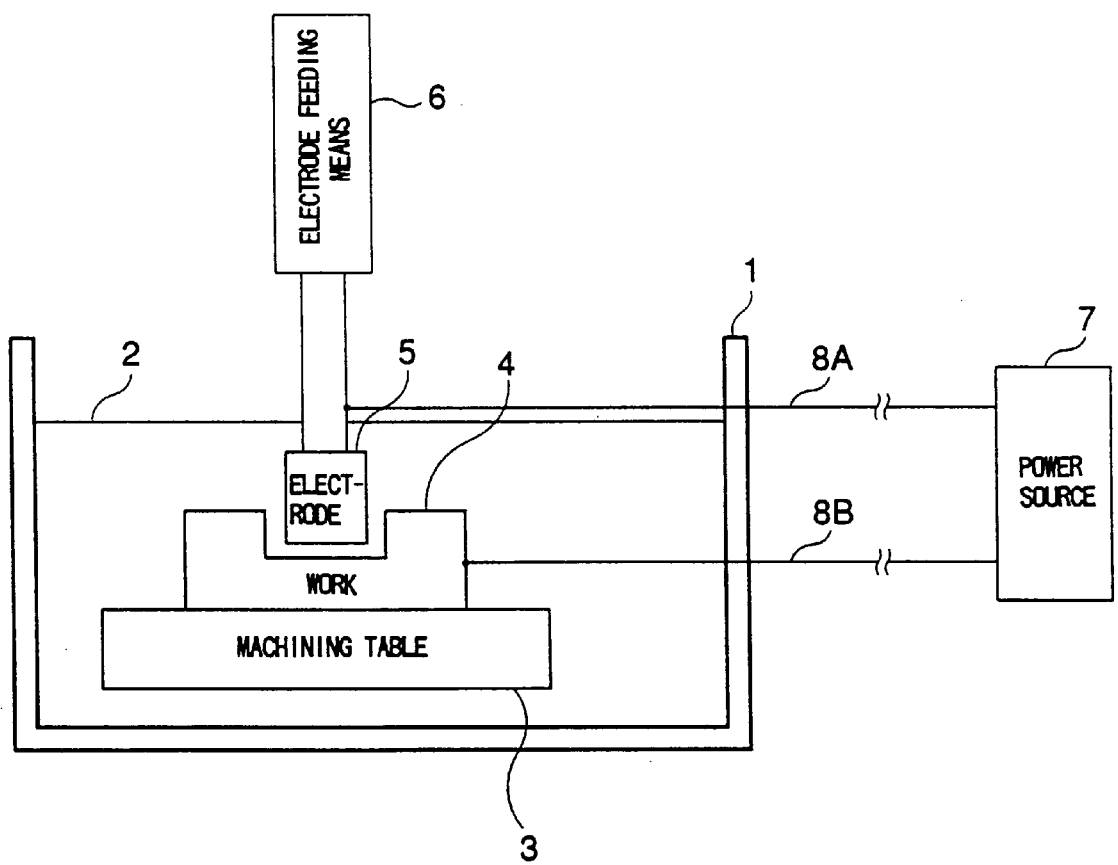
FIG. 26 is a block diagram for explanation of operations in the power supply unit for the electric discharge machine based on the conventional technology.

FIG. 25 shows Embodiment 18 of the present invention. Serial arrays of resistors 110A, 110B, 110C, 110D and DC power sources 140A, 140B, 140C, 140D are connected to wire lines provided separately from the feeder lines 8A, 8B and each penetrating through or wound around each of the plurality of saturable reactors 120A, 120B, 120C, 120D each with the feeder lines 8A, 8B for feeding a machining power from the machining power source 7 to the electrode 5 and to the work 4 penetrating therethrough or wound therearound, said reactors each having a different magnetic path length L or the different number of turns N of a core so that each of the saturable reactors 120A, 120B, 120C, 120D will be excited by a current reverse to a discharge current, and an increase curve of a discharge current can be matched to a curve suited to electric discharge machining by enabling change of each resistance value in the resistors 110A, 110B, 110C, 110D as well as of each voltage in the DC power sources 140A, 140B, 140C, 140D. The saturable reactor 120D is one with the shortest magnetic path length L and mainly decides a saturation current is. Used for the saturable reactors 120A, 120B, 120C are saturable reactors in which a magnetic path length L becomes gradually longer in the above order and also in which a cross sectional area S of a core is gradually larger in the above order, and a saturation current and a saturation time are adjusted according to a resistance value of each of the resistor as well as a voltage of each of the DC power source so that a current can be changed to an increase curve suited to machining. With this processes, an arbitrary increase curve can be obtained and the various types of excellent effect as described above can be obtained.

Also, switches 250A, 250B, 250C, 250D are provided at both edges of the feeder lines 8A, 8B penetrating through the saturable reactors 120A, 120B, 120C, 120D and any saturable reactors which are not used may be short-circuited so that a required increase curve can be obtained.

Connected to wire lines, each provided separately from the feeder lines 8A, 8B penetrating through the saturable reactors 120A, 120B, 120C, 120D, penetrating therethrough or wound therearound, are switches 251A, 251B, 251C, 251D respectively, and any saturable reactors which are not used may be short-circuited so that a required increase curve can be obtained.

The present invention is configured as described above, which brings us such effects as described below.

With the present invention, it is possible to obtain a machining-current control unit for an electric discharge machine in which generation of electric discharge can be detected even in a state of instant electric discharge, generation of electric discharge can be detected before a discharge current starts up, depletion of an electrode can be reduced, and a machining speed does not drop.

With the present invention, noise or the like due to electric discharge machining can be suppressed to a low level, an accurate signal indicating generation of electric discharge can be obtained, detection with high precision can be achieved, and a simple and low-cost machining-current control unit can be configured.

The present invention can act on prevention of static capacitance in two feeder lines and inductance thereof from resonance at the instant at which electric discharge is generated.

The present invention can act on prevention of a surge current from flowing.

With the present invention, a time required for cutting off a current is not delayed, depletion of an electrode due to a reverse current can be reduced, the resonance voltage does not occur, which makes noises be suppressed to a low level, and any malfunction due to noise given to other controllers can also be decreased.

With the present invention, a discharge current is equal to a saturation current so that only a slight amount of current flows therein for a while and a signal indicating generation of electric discharge can be obtained before the discharge current increases, and for this reason various controls can be provided immediately before a discharge current increases.

With the present invention, a saturable reactor does not give any influence at all to a discharge current after a signal indicating generation of electric discharge is outputted and a resonance current at the instant when electric discharge is generated hardly occurs.

With the present invention, if stop of electric discharge is detected, a period of time until a next electric discharge is started can accurately be obtained, so that high-precision electric discharge machining can be controlled.

With the present invention, if each generation of electric discharge in a plurality of electrodes is detected, important signals indicating a state of electric discharge machining or a feeding speed of an electrode or the like each required when the electric discharge machine is controlled can be obtained, and a plurality of electrodes and works can be machined by the same power source, so that cost of the power source can be reduced.

With the present invention, an increase curve of a discharge current immediately after electric discharge is generated can be controlled to an arbitrary curve by combining any of the saturable reactors with simple configuration.

With the present invention, a saturation current as well as a current increase curve or the like are matched to each electrode, and the electrode together with a tool is exchanged with another one, so that it is possible to obtain a waveform control unit for an electric discharge machine which can be matched to each of machining conditions for various types of electrode from smaller ones to larger ones.

With the present invention, a machining power can be fed through a coaxial cable, and such effects for improvement of the performance of a power supply unit for an electric discharge machine can be obtained such as improvement of a machining speed, possibility of micromachining, that of large current machining in a large type of electrode, prevention of noise from being irradiated to the outside, or possibility of feeding a power from a far remote place, whereby machining performance thereof can dramatically be enhanced.

With the present invention, machining can be executed by connecting a plurality of electrodes to each other with one piece of power source, which makes it possible to realize electric discharge machining in a large area with high-precision as well as with low cost.

With the present invention, machining can be executed by connecting electrodes in a plurality of machining devices to works therein with one piece of power source, so that a plurality of works each having a different form can concurrently be machined with the same one power source.

With the present invention, an arbitrary increase curve for a discharge current can be obtained, so that a current can be changed according to an increase curve suited to each of a plurality of electrodes or works, and with this feature, excellent effects such as a high-machining speed and low depletion of an electrode or the like can be obtained.

This application is based on Japanese patent application No. HEI 9-057688 filed in the Japanese Patent Office on Mar. 12, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An electric discharge machine for generating an electric discharge to machine a work comprising:
    an electrode spaced from said work and defining a discharge gap therebetween;
    a machining power source; and
    a feeder line connecting said machining power source to said electrode and said work,
    said feeder line including at least one saturable reactor, wherein said at least one saturable reactor is excited by a current reverse to a discharge current.

2. An electric discharge machine according to claim 1, wherein a serial array comprising a resistor and a DC power source excites said at least one saturable reactor.

3. An electric discharge machine according to claim 1, wherein said at least one saturable reactor having a small inner diameter is provided in a slender portion of a tool for attaching an electrode to an electrode feeder means and is supported by an insulating support.

4. An electric discharge machine according to claim 1, wherein said electric discharge machine detects a voltage generated in an electric wire penetrating or wound around said at least one saturable reactor to excite said electric wire and outputs the detected voltage as a signal indicating generation of electric discharge between the electrode and the work before said discharge current begins to increase.

5. An electric discharge machine according to claim 4, wherein said at least one saturable reactor provided to obtain a signal indicating generation of electric discharge between an electrode and a work comprises a plurality of saturable reactors each having a different magnetic path length, one having the shortest magnetic path length.

6. An electric discharge machine according to claim 5, wherein said at least one saturable reactor provided to obtain a signal indicating generation of electric discharge between an electrode and a work comprises said plurality of saturable reactors each having the different number of turns of feeder line therearound, one having the largest number of turns of feeder line.

7. An electric discharge machine according to claim 4, wherein said at least one saturable reactor provided to obtain the signal indicating generation of the electric discharge between an electrode and a work before said discharge current begins to increase, is located at a position closer to said electrode or said work, and another saturable reactor is located at a position closer to an output side of a machining power source.

8. An electric discharge machine according to claim 4, wherein, in said at least one saturable reactor with a feeder line for supplying a machining power from a machining power source to an electrode and to a work penetrating therethrough or wound therearound, an electric wire provided separately from the feeder line and penetrating or wound around said at least one saturable reactor connected to a core line of a coaxial cable as well as to a shield thereof, a serial array of a resistor and a DC power source connected to the other edge of said coaxial cable so that said at least one saturable reactor is excited by said current reverse to said discharge current, and said signal indicating generation of electric discharge between said electrode and said work before said discharge current begins to increase is obtained by comparing a voltage between a core line at the other edge of said coaxial cable and the shield to a preset value.

9. An electric discharge machine according to claim 8, wherein a resistance value of said resistor in said serial array is set to the same value as a characteristic impedance of the coaxial cable.

10. An electric discharge machine according to claim 1, wherein said electric by discharge machine detects a voltage generated in an electric wire penetrating or wound around said at least one saturable reactor to excite said electric wire and outputs the detected voltage as a signal indicating stop of electric discharge between an electrode and a work.

11. An electric discharge machine according to claim 10, wherein, in said at least one saturable reactor with a feeder line for supplying a machining power from a machining power source to an electrode and to a work penetrating therethrough or wound therearound, an electric wire provided separately from said feeder line and penetrating or wound around said at least one saturable reactor connected to a core line of a coaxial cable and a shield thereof, a serial array of a resistor and a DC power source connected to the other edge of said coaxial cable so that said at least one saturable reactor is excited by said current reverse to said discharge current, and said signal indicating stop of electric discharge between said electrode and said work is obtained by comparing a voltage between a core line at the other edge of said coaxial cable and the shield to a preset value.

12. An electric discharge machine according to claim 11, wherein a resistance value of said resistor in said serial array is set to the same value as a characteristic impedance of the coaxial cable.

13. An electric discharge machine according to claim 1, wherein said at least one saturable reactor comprises a plurality of saturable reactors each having a different magnetic path length.

14. An electric discharge machine according to claim 1, wherein said at least one saturable reactor has a form having a large diameter in the central section in the axial direction and also having a smaller diameter at position closer to either one of the two edges.

15. An electric discharge machine according to claim 1, wherein said at least one saturable reactor comprises a plurality of saturable reactors each having a different number of turns of a feeder line therearound.

16. An electric discharge machine according to claim 1; wherein a serial array of a resistor and a DC power source is connected to each of electric wires provided separately from feeder lines each penetrating or wound around each of a plurality of saturable reactors each having a different magnetic path length or the different number of turns of a feeder line for supplying a machining power from a machining power source to said electrode and to said work so that each of said plurality of saturable reactors is excited by a current reverse to a discharge current and an increase curve of the discharge current is matched to a curve suited to electric discharge machining.

17. An electric discharge machine according to claim 16; an increase curve of the discharge current is matched to a curve suited to electric discharge machining by changing a resistance value of said resistor or a voltage of said DC power source.

18. An electric discharge machining according to claim 16; wherein switches are provided in parallel to electric wires provided separately from said feeder lines and penetrating or wound around the saturable reactors and an increase curve of a discharge current is matched to a curve suited to electric discharge machining by changing combination of ON and OFF states of the switches.

19. An electric discharge machine according to claim 16; wherein switches are provided in parallel to feeder lines penetrating or wound around a plurality of saturable reactors and an increase curve of a discharge current is matched to a curve suited to electric discharge machining by changing combination of ON and OFF states of the switches.

20. An electric discharge machine for generating electric discharge to machine a plurality of works comprising:
    a plurality of electrodes;
    a machining power source;
    a plurality of feeder lines connecting the machining power source to said electrodes and said works,
    each of said plurality of feeder lines including at least one saturable reactor, wherein said saturable reactors are excited by a current reverse to a discharge current.

21. An electric discharge machine according to claim 20, wherein said at least one saturable reactor is provided to obtain a signal indicating generation of electric discharge between a plurality of electrodes and a plurality of works and is included in each of the feeder lines supplying a machining power from a machining power source to said electrode as well as to said work, said at least one saturable reactor is excited by a current reverse to a discharge current, detects a voltage generated in an electric wire penetrating or wound around said saturable reactor to excite said electric wire, and outputs the detected voltage as a signal indicating generation of electric discharge between each of said electrodes and said works, respectively, before a discharge current begins to increase.

22. An electric discharge machine according to claim 20, wherein a serial array comprising a resistor and a DC power source excites the saturable reactors.

23. An electric discharge machine according to claim 20, wherein said at least one saturable reactor having a small inner diameter is provided in a slender portion of a tool for attaching an electrode to an electrode feeding means and is supported by an insulating support.

* * * * *